US012571938B2

(12) United States Patent
Xia

(10) Patent No.: US 12,571,938 B2
(45) Date of Patent: Mar. 10, 2026

(54) MACHINE LEARNING WORKFLOW FOR PREDICTING HYDRAULIC FRACTURE INITIATION

(71) Applicant: Saudi Arabian Oil Company, Dhahran (SA)

(72) Inventor: Kaiming Xia, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1156 days.

(21) Appl. No.: 17/369,678

(22) Filed: Jul. 7, 2021

(65) Prior Publication Data

US 2023/0012733 A1 Jan. 19, 2023

(51) Int. Cl.
*E21B 43/26* (2006.01)
*G01V 20/00* (2024.01)
*G06N 5/04* (2023.01)
*G06N 20/20* (2019.01)

(52) U.S. Cl.
CPC .............. *G01V 20/00* (2024.01); *E21B 43/26* (2013.01); *G06N 5/04* (2013.01); *G06N 20/20* (2019.01); *E21B 2200/20* (2020.05)

(58) Field of Classification Search
None
See application file for complete search history.

(56) References Cited

U.S. PATENT DOCUMENTS

| | | | |
|---|---|---|---|
| 5,482,116 A | 1/1996 | El-Rabaa et al. | |
| 9,135,475 B2 | 9/2015 | Lecerf et al. | |
| 9,222,337 B2 | 12/2015 | Bunger et al. | |

(Continued)

FOREIGN PATENT DOCUMENTS

| | | |
|---|---|---|
| WO | WO 2014146004 | 9/2014 |
| WO | WO 2018117890 | 6/2018 |
| WO | WO 2021119313 | 6/2021 |

OTHER PUBLICATIONS

Sakhaee-Pour et al. "Predicting Breakdown Pressure and Breakdown Cycle in Cyclic Fracturing" (Year: 2018).*

(Continued)

*Primary Examiner* — Kamran Afshar
*Assistant Examiner* — Kurt Nicholas Pressly
(74) *Attorney, Agent, or Firm* — Fish & Richardson P.C.

(57) ABSTRACT

Systems and methods include a computer-implemented method for predicting hydraulic fracture initiation. A fracking operations dataset is prepared using historical field information for fracking wells. A set of hyper-parameters is tuned for use in a machine learning algorithm configured to predict fracture initiation for new fracturing wells. The dataset is divided into training and test datasets. A regression algorithm is applied to train the training dataset and to validate with the test dataset. A target variable of a breakdown pressure for a new hydraulic fracturing treatment is determined. A prediction dataset is updated using at least the target variable. The training dataset is trained using a classifier of the machine learning algorithm. A prediction is made using the prediction dataset whether the new hydraulic fracturing treatment can be initiated or not. The breakdown pressure is incrementally adjusted, and the method is repeated until successful hydraulic fracture initiation is predicted.

20 Claims, 7 Drawing Sheets

(56) References Cited

U.S. PATENT DOCUMENTS

| | | | |
|---|---|---|---|
| 2015/0218925 A1 | 8/2015 | Lecampion et al. | |
| 2015/0356403 A1* | 12/2015 | Storm, Jr. | E21B 49/005 |
| | | | 706/12 |
| 2017/0096881 A1 | 4/2017 | Dusterhoft et al. | |
| 2021/0087925 A1* | 3/2021 | Heidari | G06N 3/0442 |
| 2021/0180439 A1* | 6/2021 | Rawlinson | E21B 47/04 |
| 2022/0003229 A1* | 1/2022 | Mu | F04B 47/02 |

OTHER PUBLICATIONS

PCT International Search Report and Written Opinion in International Appln No. PCT/US2022/073415, dated Oct. 7, 2022, 14 pages.

U.S. Appl. No. 17/075,342, Dhahran et al., filed Oct. 20, 2020.

Ben et al., "Real-time hydraulic fracturing pressure prediction with machine learning," SPE-199699-MS, presented at the SPE Hydraulic Fracturing Technology Conference and Exhibition, The Woodlands, TX, USA, Feb. 4-6, 2020, 14 pages.

Chen et al., "XGBoost: A scalable tree boosting system," Proceedings of the 22nd ACM International Conference on Knowledge Discovery and Data Mining, ACM, 2016, 13 pages.

El-Rabaa et al., "New perforation pressure loss correlations for limited entry fracturing treatments," SPE-38373, Proceedings of the SPE Rocky Mountain Regional Meeting, Casper, Wyoming, May 18-21, 1997, 9 pages.

Makhotin et al., "Gradient boosting to boost the efficiency of hydraulic fracturing," Journal of Petroleum Exploration and Production Technology, 2019, 9(4):1919-1925, 10 pages.

Morozov et al., "Machine Learning on Field Data for Hydraulic Design Optimization: Digital Database and Production Forecast Model," European Association of Geoscientists and Engineers, presented at the First EAGE Digitalization Conference and Exhibition, Conference Proceedings, Nov. 2020, 2020:1-5, 1 page, Summary Only.

Mutalova et al., "Machine learning on field data for hydraulic fracturing design optimization," Journal of Petroleum Science and Engineering, Special Issue: Petroleum Data Science, Oct. 7, 2019, 21 pages.

Nande, "Application of machine learning for closure pressure determination," SPE-194042-STU, presented at the 2018 SPE Annual Technical Conference and Exhibition, Dallas, TX, Sep. 24-26, 2018, 10 pages.

Tamez et al., "Machine learning application to hydraulic fracturing," Proceedings SPIE 10989, Big Data: Learning, Analytics, and Applications, May 13, 2019, Baltimore, Maryland, 109890A, 1 page, Abstract Only.

* cited by examiner

500

502 ⟍
PREPARE DATASET FOR MACHINE LEARNING:
1. WELL SURVEY: TVD, AZIMUTH, DEVIATION
2. STRESS REGIME, IN-SITU STRESSES AND ORIENTATION
3. ROCK TYPES, AND ROCK MECHANICAL PROPERTIES
4. PERFORATION RELATED PARAMETERS
5. BREAKDOWN PRESSURE, FRACTURE INITIATION CLASSIFICATION

504 ⟍
ADJUST THE HYPERPARAMETERS FOR XGBOOST ALGORITHM

506 ⟍
APPLY XGBOOST REGRESSION TO TRAIN THE DATASET AND VALIDATE WITH THE TEST DATASET

508 ⟍
PREDICT THE TARGET VARIABLE OF BREAKDOWN PRESSURE FOR NEW HYDRAULIC FRACTURING TREATMENT

510 ⟍
UPDATE THE NEW PREDICTION DATASET INCLUDING PREDICTED BREAKDOWN PRESSURE

512 ⟍
CALL XGBOOST CLASSIFIER TO TRAIN HYDRAULIC FRACTURE INITIATION DATASET

514
PREDICT WHETHER HYDRAULIC FRACTURE CAN BE INITIATED?

NO →

516
ADJUST THE BREAKDOWN PRESSURE BY AN INCREMENT OF 200 psi

YES

END

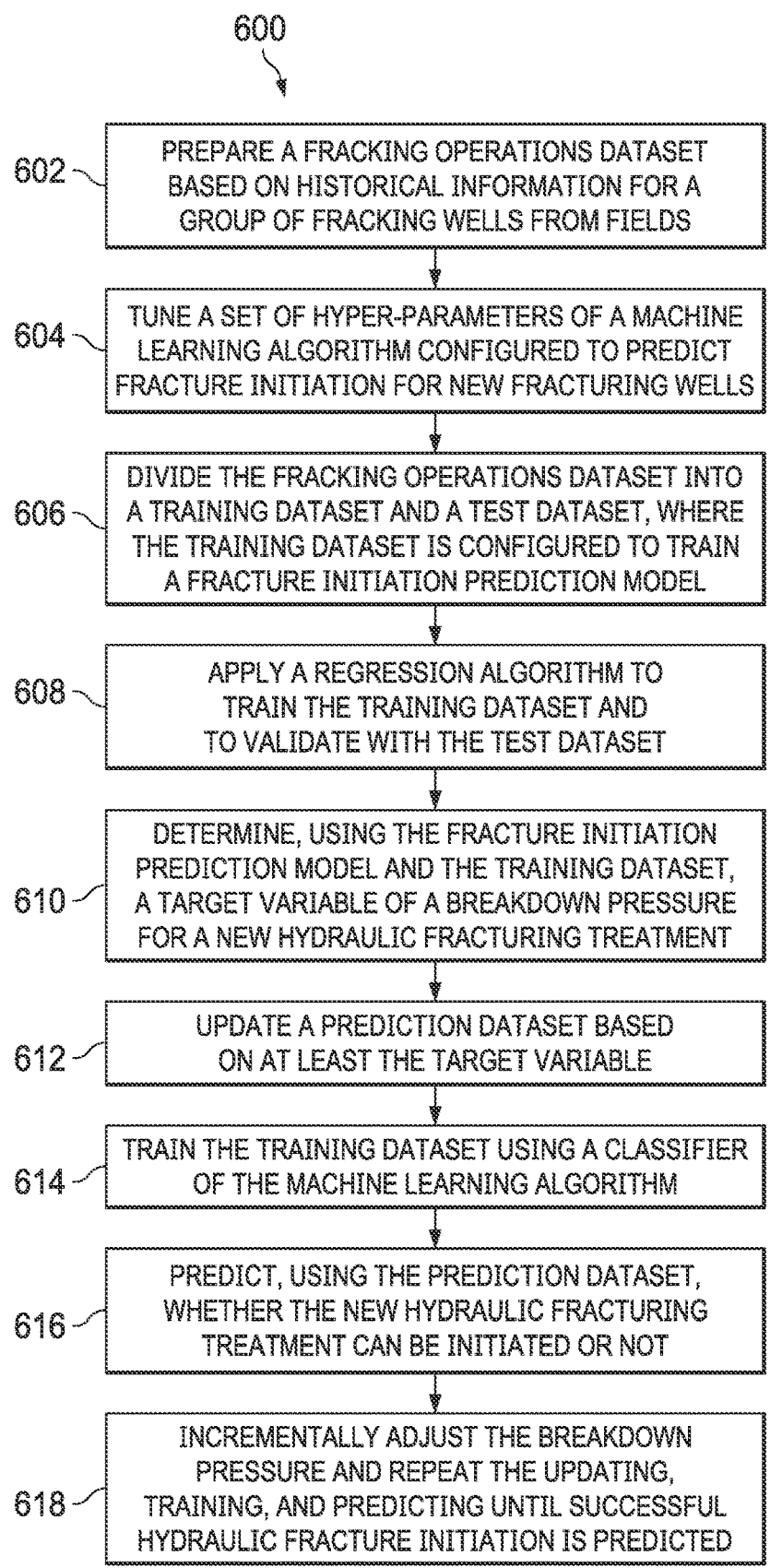

602 — PREPARE A FRACKING OPERATIONS DATASET BASED ON HISTORICAL INFORMATION FOR A GROUP OF FRACKING WELLS FROM FIELDS

604 — TUNE A SET OF HYPER-PARAMETERS OF A MACHINE LEARNING ALGORITHM CONFIGURED TO PREDICT FRACTURE INITIATION FOR NEW FRACTURING WELLS

606 — DIVIDE THE FRACKING OPERATIONS DATASET INTO A TRAINING DATASET AND A TEST DATASET, WHERE THE TRAINING DATASET IS CONFIGURED TO TRAIN A FRACTURE INITIATION PREDICTION MODEL

608 — APPLY A REGRESSION ALGORITHM TO TRAIN THE TRAINING DATASET AND TO VALIDATE WITH THE TEST DATASET

610 — DETERMINE, USING THE FRACTURE INITIATION PREDICTION MODEL AND THE TRAINING DATASET, A TARGET VARIABLE OF A BREAKDOWN PRESSURE FOR A NEW HYDRAULIC FRACTURING TREATMENT

612 — UPDATE A PREDICTION DATASET BASED ON AT LEAST THE TARGET VARIABLE

614 — TRAIN THE TRAINING DATASET USING A CLASSIFIER OF THE MACHINE LEARNING ALGORITHM

616 — PREDICT, USING THE PREDICTION DATASET, WHETHER THE NEW HYDRAULIC FRACTURING TREATMENT CAN BE INITIATED OR NOT

618 — INCREMENTALLY ADJUST THE BREAKDOWN PRESSURE AND REPEAT THE UPDATING, TRAINING, AND PREDICTING UNTIL SUCCESSFUL HYDRAULIC FRACTURE INITIATION IS PREDICTED

FIG. 6

MACHINE LEARNING WORKFLOW FOR PREDICTING HYDRAULIC FRACTURE INITIATION

TECHNICAL FIELD

The present disclosure applies to predicting breakdown pressures and fracture initiation in fracking wells.

BACKGROUND

In conventional oil fracking practices, analytical solutions have been developed for calculating breakdown pressure (for example, based on elasticity) that have generally been applicable to vertical open holes for drilling. Improvements in industry solutions have included developing a computational framework for calculating the breakdown pressure for hydraulic fracturing treatment. The framework can be applicable to deviated, cased-hole and clustered perforation hydraulic fracturing treatments. However, these analytical solutions still cannot fully capture the effect of three-dimensional (3D) complex configurations of perforated wellbores and rock damage behaviors. Further, models used in conventional solutions require the definition (for example, user entry) of several parameters along the borehole, such as parameters classified as mechanical properties, geometric parameters, and in-situ stresses and orientation. The determination of breakdown pressure can be challenging and can involve uncertainties. In practice, it can be difficult to accurately account for certain factors for calculating breakdown pressure.

SUMMARY

The present disclosure describes techniques that can be used for predicting hydraulic fracture breakdown pressure and fracture initiation. In some implementations, a computer-implemented method includes the following. A fracking operations dataset is prepared based on historical information for a group of fracking wells from fields. The fracking operations dataset is divided into a training dataset and a test dataset, where the training dataset is configured to train a fracture initiation prediction model. The training dataset should be a random selection of a high percentage of the original data like 80% or more, and the testing set should be the remaining 20% or less of the original data. A regression algorithm is applied to train the training dataset firstly, which will create the prediction model. And then to test the model with the testing dataset, which can show the accuracy of the prediction model. A set of hyper-parameters is tuned for use in a machine learning algorithm configured to predict fracture initiation for new fracturing wells. A target variable of a breakdown pressure for a new hydraulic fracturing treatment is determined using the fracture initiation prediction model and the training dataset. The training dataset is updated based on at least the target variable of breakdown pressure. Then the training dataset is trained using a classifier of the machine learning algorithm. A prediction is made using the updated training dataset whether the new hydraulic fracturing treatment can be initiated. The breakdown pressure is incrementally adjusted, and the updating, training, and predicting are repeated until successful hydraulic fracture initiation is predicted.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The present disclosure describes machine learning (ML) techniques for predicting breakdown pressure and fracture initiation, which is very critical to resolve breakdown issues for fracturing deep and tight gas reservoirs. The present disclosure presents an approach to predict hydraulic fracturing breakdown issue which is an improvement over conventional techniques, and which allows inclusion of more factors than those of analytical solutions. Techniques of the present disclosure can account for more factors or parameters related to hydraulic fracturing treatment than techniques used in conventional analytical solutions. The techniques can be used to reasonably predict the results even with few parameters partially missed.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 5 is a diagram showing an example of a workflow for applying XGBoost method to predict breakdown pressure and to classify whether hydraulic fractures can be successfully initiated or not, according to some implementations of the present disclosure.

FIG. 6 is a flowchart of an example of a method for predicting hydraulic fracture initiation, according to some implementations of the present disclosure.

Like reference numbers and designations in the various drawings indicate like elements.

DETAILED DESCRIPTION

The following detailed description describes techniques for predicting hydraulic fracture initiation. The techniques can be used to estimate breakdown pressure and hydraulic fracture initiation for hydraulic fracturing treatment, especially for fracturing deep and tight gas/oil reservoirs. The techniques can be extended to predict more variables related to hydraulic fracturing treatment. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 2:
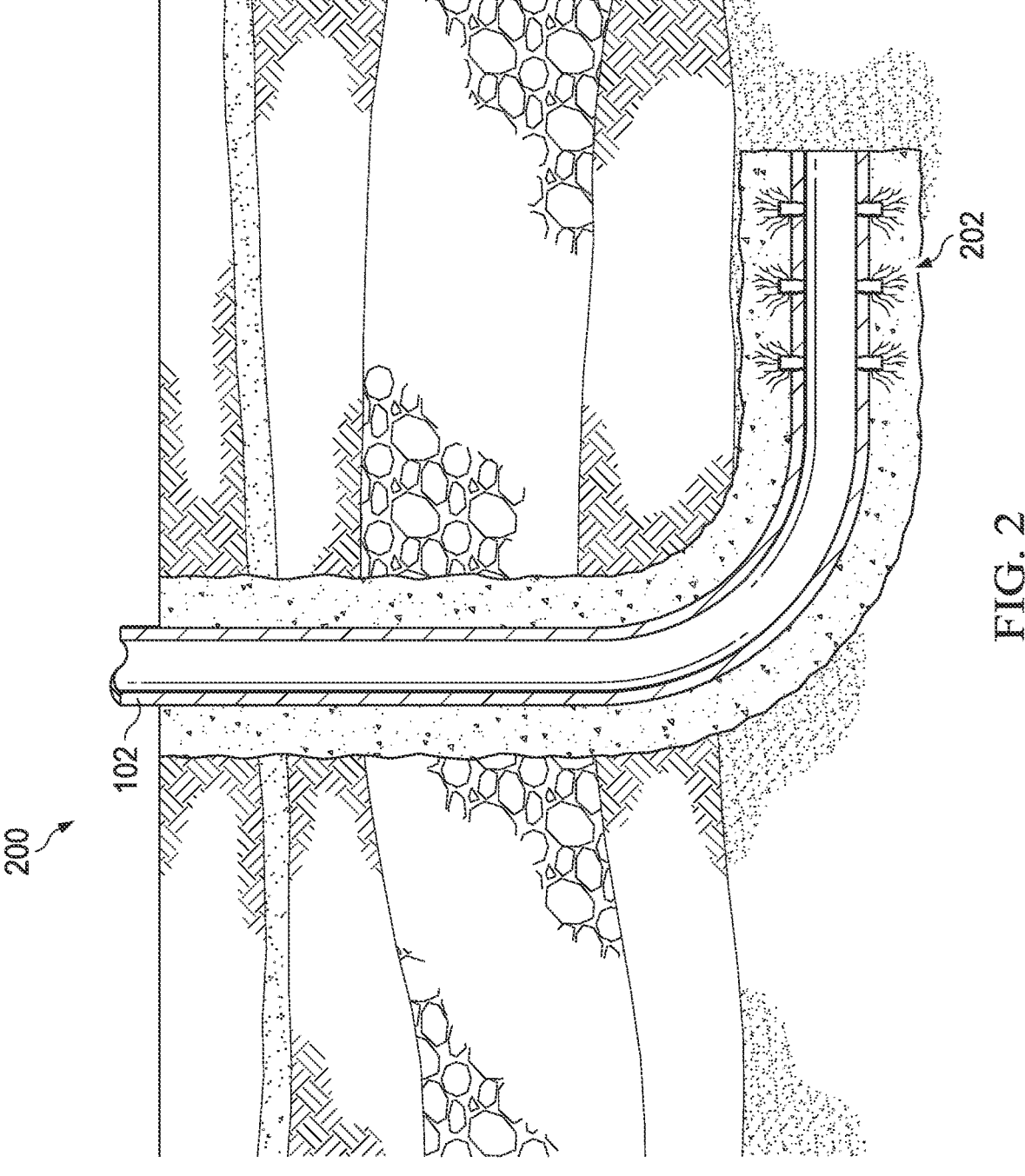
FIG. 2 is a diagram of an example of a deviated, cased hole, and clustered perforation hydraulic fracturing well, according to some implementations of the present disclosure.

Estimating breakdown pressure is essential for a successful hydraulic fracturing treatment, especially for fracturing deep and tight reservoirs. For hydraulic fracturing treatment, the best practices of hydraulic fracturing design can include estimating the breakdown pressure as accurately as possible, in order to select the right casing, treatment tubing, and wellhead based on the estimates. Unfortunately, typical conventional hydraulic fracturing simulators cannot accurately predict the breakdown pressure, for example, due to model simplifications. New computational frameworks may be developed for calculating breakdown pressure applicable to deviated, cased hole, and clustered perforation hydraulic fracturing treatment (see FIG. 2). Models used with reference to FIG. 2 represent a first time that a breakdown pressure mechanics model accounts for the casing-cement-formation interaction effects that can be used in the calculation of breakdown pressure. The calculation of breakdown pressure requires several parameters along the borehole, which can be classified as mechanical properties, geometric parameters, and in-situ stresses and orientation. Realistic inputs of these parameters involve significant uncertainties due to spatial variability and uncertainties, logging measurements, and data processing. Analytical solutions cannot account for the effects of three-dimensional (3D) complex configurations of perforated wellbore and rock damage behavior. The current disclosure offers a new approach to predict breakdown pressure using machine learning (ML), which is a subset of artificial intelligence (AI) and uses computer algorithms to analyze hydraulic fracturing data from field and make intelligent decisions based on what is learned. Instead of following rule-based algorithms, machine learning builds models to regress, classify, and make predictions from the data collected from fields. There is no need to worry the mechanics of whether or not model defects exist. For the breakdown or fracture initiation issue, the parameters that are likely related to the breakdown pressure calculation are known. Machine learning can make it possible to represent different factors related to hydraulic fracturing breakdown pressure. Some parameters not appearing in an analytical model, for example, can be included in machine learning. A top priority of machine learning is to collect enough hydraulic fracturing data, corresponding breakdown pressure that is used, and success or failure information (for example, as a success/failure flag). With machine learning, and given the dataset of hydraulic fracturing data, a model can be created. Further, using data inputs, the model can learn and predict the breakdown pressure for new hydraulic fracturing design.

To better include all the parameters likely related to breakdown pressure and fracture initiation issue, ML can be used. As a subset of AI, ML is an area of computational science that focuses on analyzing and interpreting patterns and structures in data to enable learning, reasoning, and decision-making outside of human interaction. Machine learning allows the user to feed a computer algorithm an immense amount of data, from which the computer analyzes the data and makes data-driven recommendations and decisions based on only the input data. If any corrections are identified, the algorithm can incorporate that information to improve its future decision-making.

In some implementations, a workflow for predicting hydraulic fracture initiation can include the following. Potential factors are identified that impact hydraulic fracturing breakdown pressure and hydraulic fracture initiation. A workflow is established to conduct machine learning to predict the breakdown pressure required for a hydraulic fracture initiation. A machine learning workflow is established to classify the fractability issue for deep and tight gas reservoirs.

Figure 1:
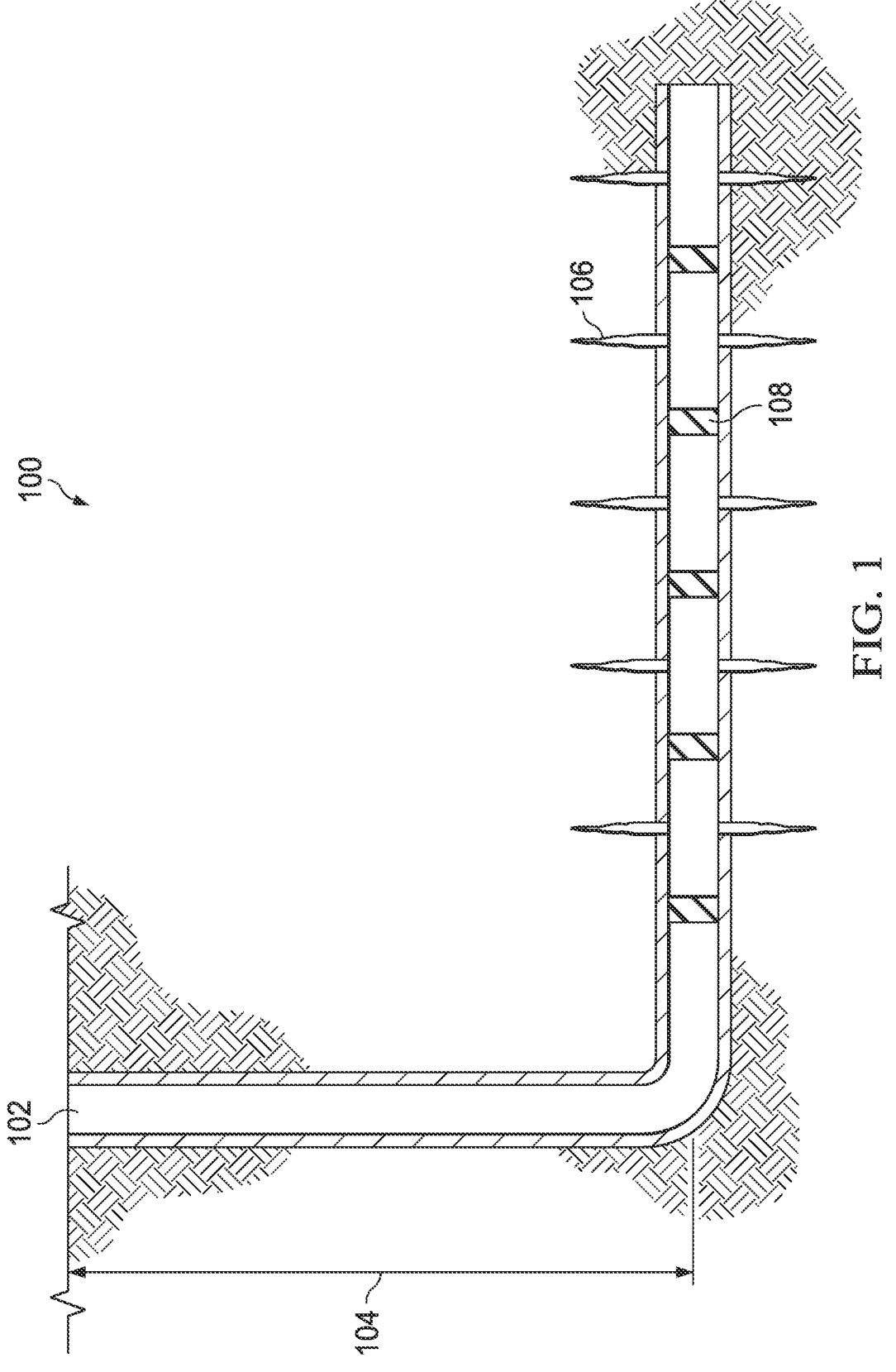
FIG. 1 is a diagram of an example system for hydraulic fracturing treatment using a plug-and-perf method, according to some implementations of the present disclosure.

FIG. 1 is a diagram of an example system 100 for hydraulic fracturing treatment using a plug-and-perf method, according to some implementations of the present disclosure. The method can be used in a wellbore 102 drilled to a selected true vertical depth (TVD) 104, for example, measured from the Kelly bushing point at the drilling rig. Fractures 106 and packers 108 are located downstring in the wellbore 102.

Accurate prediction of breakdown pressure, such as in the wellbore 102, is a first step in designing a successful hydraulic fracturing treatment. For deep and tight gas reservoirs, hydraulic fracturing treatments may fail at the beginning due to the breakdown issue. Conventional solutions do not capture all the related factors used in calculating the breakdown pressure for deviated, cased hole, and clustered perforation hydraulic fracturing treatments.

In conventional solutions, machine learning has been used to predict closure pressure, production rate, and wellhead pressure, which are somewhat related to hydraulic fracturing treatment. However, none of these parameters is directly related to predicting breakdown pressure for hydraulic fracturing treatment.

The present disclosure describes a new approach for predicting breakdown pressure related to hydraulic fracturing treatment using ML, and making intelligent decisions based on what has been learned from field data on hydraulic fracturing treatment. This allows the representation of even more factors than mechanical properties, geometries, and perforation friction available used in the analytical models. Instead of following mechanics-based algorithms, machine learning can build models to regress/classify and make predictions from previous field data. For the breakdown or fracture initiation issue, parameters likely relating to breakdown pressure calculation are known. Machine learning is able to allow the representation of different factors related to hydraulic fracturing breakdown pressure. In some cases, hydraulic fracturing parameters might be missing, however the machine learning algorithm used here still can predict the results. Some parameters not appearing in the analytical model also can be included in the machine learning. With machine learning and given the dataset of hydraulic fracturing data, a model can be created and learned that, given inputs, can predict the breakdown pressure for new hydraulic fracturing design. Further, the model can be used to classify the fractability in terms of fracture initiation being successful or not.

Parameters Impacting Hydraulic Fracturing Breakdown

Hydraulic fracturing represents a well stimulation technique and has been used to stimulate production from tight reservoirs with low permeability. The process involves the high pressure injection of fracking fluid (primarily slick water, containing proppants) into a wellbore first, with the fluid then flowing through perforations to create fractures in the reservoir (see FIG. 2). The small size proppants will hold the fracture open after hydraulic pressure declines or hydraulic fluid flows back. Fracturing occurs whenever effective stress in the formation is overcome by the fluid pressure within the fractures. The minimum principal stress becomes tensile and exceeds the tensile strength of the rock. Hydraulic fractures are generally oriented in the direction perpendicular to the minimum principal stress and therefore propagate along the maximum horizontal (hor.) stress direction in subsurface. For cased hole/perforation hydraulic fracturing treatment, the breakdown pressure refers to the internal casing pressure when fracture initiates from the perforation tunnel. From a mechanics point of view, the breakdown pressure of perforation is a three-dimensional mechanics problem and is very difficult to obtain in a closed form analytical solution. Rock breakdown or fracture initiation is a first must for a successful hydraulic fracturing treatment. For hydraulic fracturing treatment, accurately estimating the breakdown pressure of formation is very critical, facilitating control in selecting the right tubing size and grade, wellhead grade and burst pressure limiting requirement as well as pump schedule design. The best practice of hydraulic fracturing design is to estimate the breakdown pressure as accurately as possible in the first place, and select the right treatment tubing, and wellhead thereafter. Otherwise, a hydraulic fracturing pump schedule cannot be injected as planned if breakdown pressure were underestimated in the first place. This can eventually lead to giving up hydraulic fracturing treatment.

Unfortunately, most of the currently used hydraulic fracturing simulators cannot accurately predict the breakdown pressure due to model simplifications. The several reasons include, for example: (1) the 3D complex configuration of perforated wellbore cannot be captured in the modeling; (2) numerical models have to use very coarse mesh size; (3) rock damage behavior cannot be considered; and (4) only maximum tensile stress criteria is used in the available analytical solutions. However, published models on this topic can clearly help to understand which parameters are important to determining rock breakdown and fracture initiation.

FIG. 2 is a diagram of an example of a deviated, cased hole, and clustered perforation hydraulic fracturing well 200, according to some implementations of the present disclosure. FIG. 2 shows perforations 202 downstring in the wellbore 102.

Figure 3:
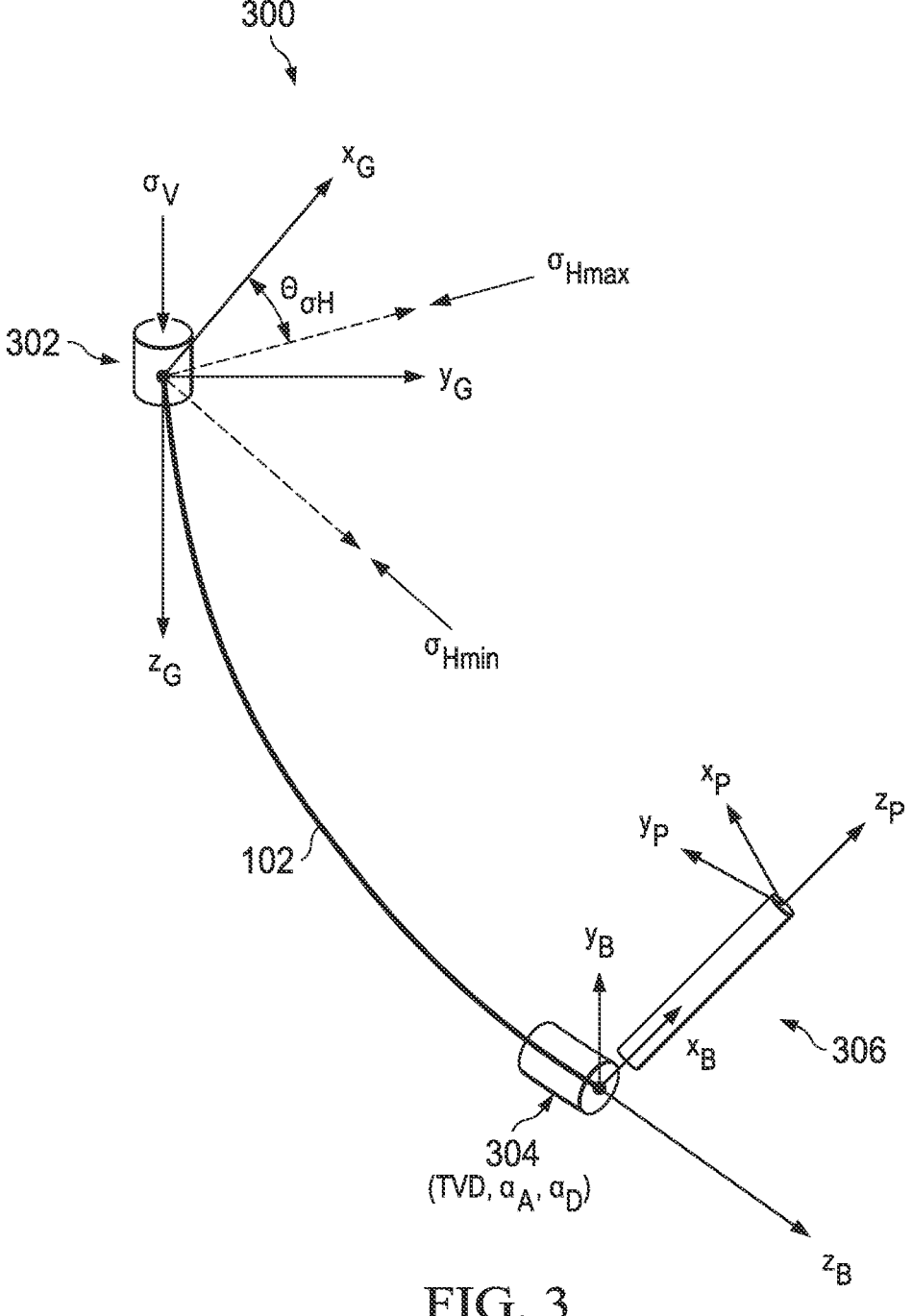
FIG. 3 is a diagram of an example of in-situ stresses and a maximum horizontal stress angel for a deviated well and perforation hydraulic fracturing treatment, according to some implementations of the present disclosure.
Figure 4:
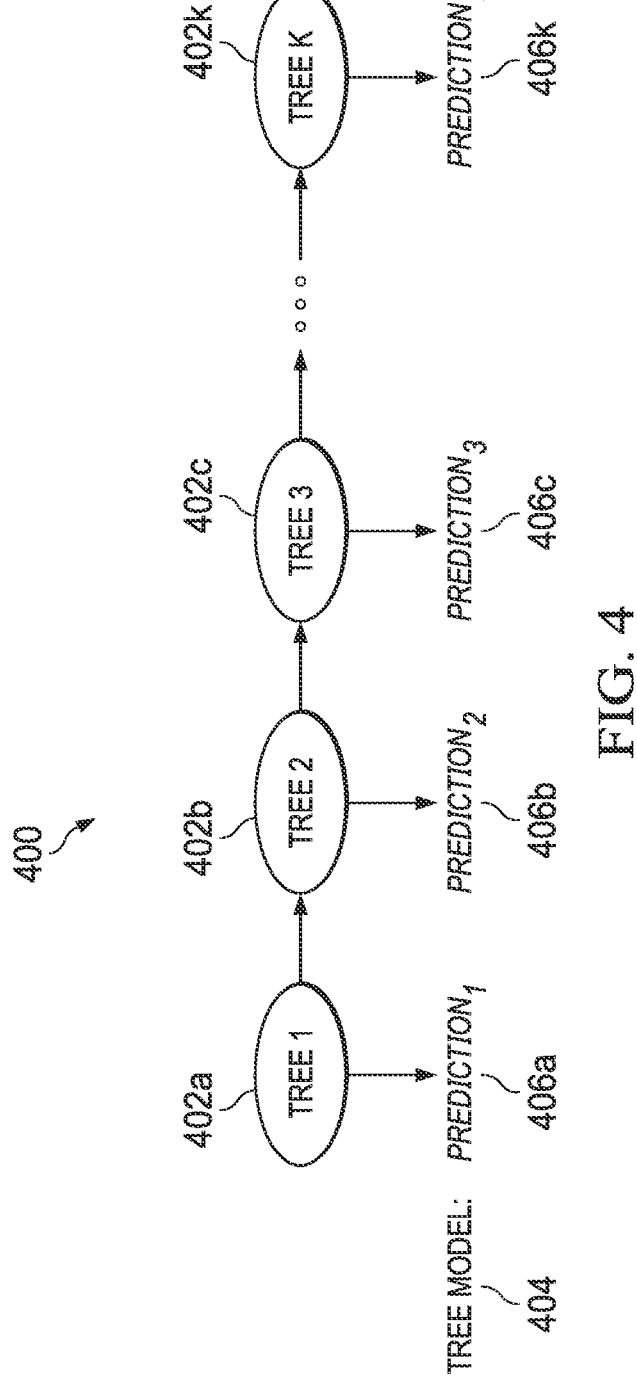
FIG. 4 is a diagram showing an example of a new tree that is generated along the direction of negative gradient of loss function, according to some implementations of the present disclosure.

FIG. 3 is a diagram of an example of in-situ stresses and a maximum horizontal stress angle for a deviated well 300 and perforation hydraulic fracturing treatment, according to some implementations of the present disclosure. For the deviated well 300, cased hole and clustered perforation hydraulic fracturing treatment, the breakdown pressure calculation is much complex than for an open vertical hole. For analytical approach, the far field in-situ stresses are first to be transformed from a global coordinate system to a local coordinate system associated with the individual perforation (see FIG. 3). The coordinate system can be used to define coordinates of points 302 and 304 along the wellbore, with the second point 304 being at a perforation 306. In some frameworks, the global coordinate system can be defined as a situation in which the x-axis aligns with the North direction, the y-axis aligns with the East direction, and the z-axis is vertically downwards.

This coordinate system is denoted by a global coordinate system $(x_G y_G z_G)$. To be general, assume the azimuth of maximum principal stress is $\theta_{94\,H}$, which is the angle turning clockwise from North to the maximum principle stress. For a well survey, any point along the well trajectory can be determined by three parameters: MD (measured depth), $\alpha_D$(wellbore deviation), and $\alpha_A$ (wellbore azimuth). The coordinate system at any point along the well trajectory can be tracked and obtained by the following rotations about the global coordinate system, $x_G y_G z_G$, particularly following two steps: (1) rotation of deviation $\alpha_D$ about the $y_G$-axis; and (2) rotation of azimuth $\alpha_A$ about the $z_G$-axis. The coordinate system for different phase angles of perforation tunnels can be rotated by two steps: (1) rotating $\alpha_{y,B}=\pi/2$ about the $y_B$-axis of the wellbore coordinate system; and (2) rotation of phase angle $\alpha_{Z,B}$ about the $z_B$-axis of the wellbore coordinate system. The breakdown pressure for each phase perforation of the perforation cluster should be calculated, and the minimum one of the calculated pressures will be considered as the required breakdown pressure for the perforation cluster. Obviously the landing depth of TVD, azimuth and deviation are important parameters used in the analytical solutions, which should be considered in the ML dataset.

For cased hole, the impact of casing and cement on breakdown pressure has been considered in recent innovations. The mechanical properties of casing and cement should be accounted for when estimating breakdown pressure. Also, the corresponding inner diameter (ID) and outer diameter (OD) of casing and cement should be considered. Fracture initiation from the wellbore-perforation interface hinges on the fluid pressure inside the perforation tunnel. Calculations of the fluid pressure acting on the perforation tunnel should account for the pressure loss across the perforation, which is important for hydraulic fracturing pump schedule design. Currently, a sharp-edge orifice equation is widely used to estimate the pressure drop as follows:

$$\Delta P_{perf} = \frac{0.2369\rho}{d^4 C_d^2}\left(\frac{Q}{N}\right)^2 \tag{1}$$

where $\rho$ is a fluid density in pounds per gallon (lb/gal); d is an initial perforation diameter in inches (in.); $C_d$ is a perforation coefficient of discharge; Q is a flow rate in barrels per minute $$\left(\frac{bbl}{min}\right),$$

and N is a number (no.) of perforations (perf.). From the above equation, it can be seen that the perforation diameter, flow rate, and number of perforations should be better included in the ML data list.

Hydraulic Fracturing Training Dataset

It is seen that related parameters impact the hydraulic fracturing treatment. The key parameters are collectively listed in Tables 1A and 1B (where Table 1B contains the additional columns of Table 1A). The parameters are classified as several groups, which are related to well trajectory and orientation, rock type, stress regime types, in-situ stresses and orientation, reservoir (res.) pressure, rock mechanical properties, and perforation parameters. As evidenced in recent innovations, well trajectory and orientation control the perforation orientation and provide a big impact on the required magnitude of breakdown pressure as well as in-situ stress tensor. Generally, hydraulic fracturing treatment is likely to be executed in a normal fault and strike-slip two stress regime. In this dataset, normal fault can be classified as 1 and strike-slip as 2. Rock types do not appear directly in the analytical formulations but likely impact the breakdown pressure and hydraulic fracturing outcome, which are generally reflected through mechanical properties. In this machine learning approach, rock type is also included in the dataset to train the model (for example, classified as 1 for shale, 2 for sandstone, and 3 for carbonate). Rock properties such as porosity are also included in the dataset for machine learning prediction. As indicated in Equation (1), perforation quality can directly impact the breakdown pressure. The number of perforations are included for each perforation cluster, perforation interval, and perforation diameter. These different groups of variables can be factored into predicting the required breakdown pressure for a successful hydraulic fracture initiation. Therefore, the corresponding breakdown pressure is included in the dataset for machine learning, which will be the prediction target variable. Also, the success or failure of fracture initiation can be included in the machine learning dataset as another predicted target variable. The success/failure will be labeled as 1 if hydraulic fractures successfully initiate, and otherwise labeled as 0 if hydraulic fractures fail to initiate.

Introduction to Machine Learning—XGBoost Method

Machine learning has applications in many industrial areas. Machine learning is typically made up of three parts: (1) the computational algorithm at the core of making determinations; (2) variables and features that make up the decision; and (3) a knowledge base for which the answer is known that enables training the system to learn. Initially, the model is fed parameter data for which the answer is known. The algorithm is then run, and adjustments are made until the algorithm's output (learning) agrees with the known answer. At this point, increasing amounts of data are able to help the system learn and process higher computational decisions.

XGBoost has emerged as one of the most popular machine learning algorithms currently used in the industry, regardless of the type of prediction task at hand, regression or classification. XGBoost is well known to provide better solutions than other machine learning algorithms. The algorithm is known for its good performance as compared to all other machine learning algorithms. In fact, the algorithm has become the "state-of-the-art" machine learning algorithm to deal with structured data. XGBoost has enhanced performance and speed in tree-based (sequential decision trees) machine learning algorithms. In Gradient Boosting algorithms, the loss function is optimized. Also, XGBoost is an advanced implementation of gradient boosting along with some regularization factors.

XGBoost is used for supervised learning problems such as regression, classification, and ranking, where the training

TABLE 1A

Variables for machine learning for predicting hydraulic fracturing treatment (cont.)

| Fracturing Treatment Number | Landing depth Feet (ft) $x_1$ | Well Azimuth @fracturing point (degree) $x_2$ | Deviation @fracturing point (degree) $x_3$ | Stress regime — $x_4$ | Max horizontal stress angle (degree) $x_5$ | Vertical stress (psi) $x_6$ | Maximum horizontal stress (psi) $x_7$ | Minimum horizontal stress (psi) $x_8$ |
|---|---|---|---|---|---|---|---|---|
| 1 | 14103 | 67.7 | 3.6 | 1 | 65 | 15421 | 14087 | 12642 |
| 2 | 14220 | 61.5 | 4.2 | 2 | 65 | 15573 | 17236 | 15554 |
| 3 | 14333 | 57.2 | 4.5 | 1 | 65 | 15712 | 15620 | 15396 |
| . . . | . . . | . . . | . . . | . . . | . . . | . . . | . . . | . . . |
| N | 14660 | 27.6 | 88.0 | 1 | 65 | 15125 | 15606 | 13033 |

For stress regime: Normal fault = 1, Strike-slip = 2
For rock type: Shale = 1, Sandstone = 2, Carbonate = 3
For hydraulic fracture initiation, success = 1, failure = 0

TABLE 1B

Variables for machine learning for predicting hydraulic fracturing treatment

| Fracturing Treatment Number | Reservoir pressure (psi) $x_9$ | Rock type — $x_{10}$ | Tensile strength (psi) $x_{11}$ | Uniaxial Compressive Strength (UCS) (psi) $x_{12}$ | Number of perforation shots — $x_{13}$ | Perforation interval (ft) $x_{14}$ | Perforation diameter (in) $x_{15}$ | Breakdown pressure (psi) $y_1$ |
|---|---|---|---|---|---|---|---|---|
| 1 | 8857 | 1 | 1267 | 9075 | 12 | 2 | 0.042 | 17109 |
| 2 | 8861 | 1 | 1748 | 17478 | 12 | 2 | 0.042 | 16996 |
| 3 | 8864 | 1 | 1622 | 16219 | 12 | 2 | 0.042 | 18916 |
| . . . | . . . | . . . | . . . | . . . | . . . | . . . | . . . | . . . |
| N | 8521 | 2 | 1278 | 16929 | 12 | 2 | 0.042 | 19270 |

For stress regime: Normal fault = 1, Strike-slip = 2
For rock type: Shale = 1, Sandstone = 2, Carbonate = 3
For hydraulic fracture initiation, success = 1, failure = 0 data is used with multiple features $x_i$ to predict a target variable $y_i$. The process can start with an arbitrary initial prediction. This can be the average in the case of regression. At first, all residuals are calculated into each leaf, and the similarity score is calculated by simply setting $\lambda=0$. An attempt is made to split the residuals into two groups by clustering similar residuals. The similarity score is calculated for each group, which are named as left leaf and right leaf. A quantification is made regarding how much better the leaves cluster similar residuals than the root by calculating the gain. The gain is given by:

$$\text{Gain} = \text{Left leaf similarity} + \text{Right leaf similarity} - \text{Root leaf similarity} \quad (2)$$

$$= \frac{G_L^2}{H_L + \lambda} + \frac{G_R^2}{H_L + \lambda} - \frac{(G_L + G_R)^2}{H_L + H_R + \lambda}$$

In the above equation, $G_L$ is the sum of residual of the left leaf, $G_R$ is the sum of residual of the right leaf, $H_L$ is the number of the left leaf, $H_L$ is the number of the right leaf. After this, the gain can be compared with the gains corresponding to other thresholds to select the largest gain for better split. The process can start by picking a number as a threshold $\gamma$, which represents the user-definable penalty and is meant to encourage pruning. The difference of (Gain−$\gamma$) between the gain associated with the lowest branch in the tree and the value for $\gamma$ is calculated. If the difference between the gain and gamma is negative, the branch is removed. If the difference is positive, the branch is kept and pruning is continued.

The process continues with the original residuals, and a tree is built just like before. The similarity score and gain are calculated in the same way. When lambda is greater than 0, the similarity and gain will be smaller, making it easier to prune leaves. The value of lambda can prevent over-fitting of the training data. After the tree is built, the output value of the tree is determined, which is calculated by:

$$\text{Output} = \frac{\sum \text{Residuals}}{\text{Number of Residuals} + \lambda} \quad (3)$$

A prediction can then be based on the tree. The first prediction is:

$$\text{Prediction\_1} = \hat{\gamma}_i^0 + \text{Learning Rate*output (first prediction)} \quad (4)$$

The process can simply compare the new residuals, determining whether small steps are taken in the right direction. The process can keep building other trees based on new residuals. Make new predictions can result in smaller residuals until residuals are very small or have reached a threshold (for example, maximum number).

Assuming that a dataset contains totally n samples, which means n rows, then i can represent each example in the dataset. XGBoost can use a loss function to build trees by minimizing the following value:

$$L(\theta) = \Sigma_i L(\hat{y}_i - y_i) + \Sigma_k \Omega(f_k) \quad (5)$$

$$\Omega(f) = \gamma T + \tfrac{1}{2}\lambda \|w\|^2 \quad (6)$$

In this equation, the first part represents the loss function which calculates the pseudo residuals of predicted value $\hat{y}_i$ and true value $y_i$ in each leaf. The second part contains two parts as described previously. The last part in Equation (6) contains regularization term) $\lambda$, which intends to reduce the prediction insensitivity to individual observations. The term w represents the leaf weight, which can be considered as the output value for the leaf. Also, T represents the number of terminal nodes or leaves in a tree. Also, $\gamma$ is defined as representing the user-definable penalty, which is meant to encourage pruning.

For the XGBoost method, an additive strategy can be used, fixing what has been learned, and adding one new tree at a time. A new tree can be generated along the direction of a negative gradient of a loss function defined by Equation (5). The loss will be become smaller and smaller as the number of tree models increases. The residuals can be used to construct a decision tree. The process can be repeated until the training reaches the maximum number of estimators (for example, using a default of 100). Once training is completed for the model, the predictions made by the XGBoost model as a whole include the sum of the initial prediction and the predictions made by each individual decision tree multiplied by the learn rates.

FIG. 1 is a diagram showing an example of a new tree 402k that is generated along the direction of negative gradient of loss function, according to some implementations of the present disclosure. The tree 402k can be generated as part of a prediction process 400 using a tree model 404 that progresses with predictions 402a, 402b, 402c, and so on before a final prediction at the new tree 402k.

The prediction value at step i can be written as $\hat{\gamma}_i^t$. Then:

$$\hat{y}_i^0 = \text{Initial Prediction} \quad (6)$$

$$\hat{y}_i^1 = \hat{y}_i^0 + \text{Learning Rate*Prediction\_1 (first prediction)} \quad (7)$$

$$\hat{y}_i^2 = \hat{y}_i^1 + \text{Learning Rate*Prediction\_2 (second prediction)} \quad (8)$$

$$\hat{y}_i^t = \Sigma_{k=1}^t f_k(x_i) = \hat{y}_i^{t-1} + \text{Learning Rate*Prediction\_}k(k^{th} \text{ prediction}) \quad (9)$$

Workflow for Applying Machine Learning XGBoost to Predict Breakdown Pressure and Fracture Initiation FIG. 5 is a diagram showing an example of a workflow 500 for applying XGBoost method to predict breakdown pressure and to classify whether hydraulic fractures can be successfully initiated or not, according to some implementations of the present disclosure. A first step of the workflow 500 is to collect enough hydraulic fracturing field data as feasibly possible. For example, at 502, a dataset is prepared for machine learning, including a well survey (TVD, azimuth, and deviation); a stress regime, in-situ stresses and orientation; rock types and rock mechanical properties; perforation related properties; and a breakdown pressure and a fracture initiation classification. Quite a large amount of uncertainty can exist in the input data describing the design of a hydraulic fracturing treatment. Collecting enough field data can take some time and can require special skills to filter out unreliable noise from the field data since they are full of uncertainties. At 504, hyper-parameters for the XGBoost algorithm are adjusted or tuned. The dataset is divided into training data and test data. Generally, most (for example, 90%) of the dataset can be used as training data, and the rest (for example, 10%) can be used as test data. At 506, XGBoost regression is applied to train the dataset and validate with the test data. For example, the training data can be used to train the boosted tree algorithms to make accurate predictions for predicting targeted variable $y_i$. Once the trees are determined, the accuracy of the prediction can be tested with the help of test data. For training the XGBoost model, the more dataset from field wells will be more objective and accurate. Once the XGBoost model is validated, the model can be used to predict the targeted variable $y_i$. The first targeted variable is to predict breakdown pressure for hydraulic fracturing treatment in this disclosure. XGBoost regression will be used to establish the relationships between features $x_i$ and the result $y_i$, where $y_i$ is a continuous variable. Once the breakdown pressures for new hydraulic fracturing treatments are predicted at 508, the breakdown pressures can be added to a prediction dataset at 510 as initial breakdown pressures for the new hydraulic fracturing design. The second machine learning part can be used to predict whether the new hydraulic fracture design with the predicted breakdown pressure can initiate hydraulic fracture successfully or not. Fracture initiation can be labeled as a discrete class label y based on many input features $x_i$. The XGBoost Classifier can be used to predict fracture initiation success/failure for this part machine learning. In this case, at 512, if the first XGBoost Classifier predicts no fracture initiation can be achieved, and the breakdown pressure will be increased, at 516, at an increment of 200 pounds per square inch (psi) or other number. Then, iteration occurs using the XGBoost Classifier to check, at 514, whether updated breakdown pressure can successfully initiate hydraulic fracture or not. It might take several iterations to find a breakdown pressure which can guarantee a successful hydraulic fracture initiation. The workflow can be implemented using a Python script, for example.

Example Study for Demonstration

In this section, an example study is presented on applying the XGBoost method to predict the breakdown pressure for hydraulic fracturing treatment. As collectively shown in Tables 1A and 1B, more parameters are collected for the machine learning study than those used for analytical approach. Some of the potential parameters not used for an analytical solution are also included in the machine learning model, such as stress regime, rock type, porosity, number of perforations, perforation interval, and perforation diameter. As a demonstration, 100 sets of fracturing stage cases were generated. Increasing the number of samples that are provided to a supervised learning algorithm leads to improved precision in regressing and classifying new data. The complete dataset is listed in Tables 2A and 2B (where Table 2B contains the additional columns of Table 2A). In this case, 90% of the dataset can be used to train the model. Once trained and validated, the model can be used to predict the breakdown pressure based on the input dataset of new hydraulic fracturing stages listed in Tables 3A and 3B (prediction dataset). Input dataset also refers to the prediction dataset in this disclosure. The new predicted breakdown pressures are bolded in the last column of Table 3B (where Table 3B contains the additional columns of Table 3A). Compared to the machine learning example study shown in Tables 2A, 2B, 3A, and 3B, a parameter of porosity is added to the dataset for training the model as shown in Tables 4A and 4B (where Table 4B contains the additional columns of Table 4A). Based on the dataset shown in Tables 4A and 4B for machine learning, the predicted breakdown pressures are listed in Tables 5A and 5B (where Table 5B contains the additional columns of Table 5A), which are different from those predicted breakdown pressures in Tables 3A and 3B. A feature of the XGBoost algorithm is that the algorithm can handle missing values. The algorithm is designed in such a way that the algorithm can identify and define the trends in the missing values.

As previously described, the XGBoost method can be used to classify new data. In the current case, some sets of the hydraulic fracturing dataset can be collected, including labels of hydraulic fracturing initiation success/failure, which will be used to build the classification model. Tables 6A and 6B collectively show the part of the dataset used to classify hydraulic fracturing initiation (where Table 6B contains the additional columns of Table 6A). Success/failure can be labeled as 1 if hydraulic fracture initiation is successful or labeled as 0 if hydraulic fracture initiation is a failure. Compared to the regression part of training for breakdown pressure, one more variable is added to represent hydraulic fracture initiation. This part of machine learning is achieved by using the XGBoost classifier function. Tables 6A and 6B list the training dataset, and Tables 7A and 7B list the machine learning prediction (where Table 7B contains the additional columns of Table 7A). As listed in Tables 7A and 7B, four cases of hydraulic fracturing designs with the planned breakdown pressure will likely initiate hydraulic fracture propagating, and the other two will fail to initiate hydraulic fractures. In this situation, the breakdown pressure can be increased using an increment of 200 psi, 300 psi or 400 psi to the failed cases of designed breakdown pressure listed in Tables 7A and 7B. Then, the XGBoost classifier part can be rerun to see whether updated hydraulic fracturing breakdown pressure can achieve a fracture initiation or not. It might need several iterations to find a breakdown pressure, which allows XGBoost Classifier to predict a successful fracture initiation.

Machine learning can be used to direct hydraulic fracturing (fract.) design, which can open an avenue toward an expert system for advising field engineers on determining an optimal set of hydraulic fracturing design parameters. An optimal set of parameters, as defined in the present disclosure, can represent a set of parameters, for example, as listed in Tables 1A and 1B. The optimal set of parameters can include parameters such as landing depth of TVD, well trajectory, stress regime, in-situ stresses and maximum (max.) stress angle, reservoir pressure, rock type, rock properties, perforation parameters, and required breakdown pressure. The required breakdown pressure can be calculated either using analytical or numerical methods, or using an artificial intelligence (AI)/machine learning (ML) approach.

TABLE 2A

Dataset for machine learning to predict hydraulic fracturing breakdown pressure

| Fracturing treatment number | Landing Depth | Well Azimuth @fracturing point | Deviation @fracturing point | Stress regime | Max horizontal stress angle | Vertical stress | Maximum horizontal stress | Minimum horizontal stress |
|---|---|---|---|---|---|---|---|---|
| 1 | 14103 | 67.7 | 3.6 | 1 | 65 | 15421 | 14087 | 12642 |
| 2 | 14220 | 61.5 | 4.2 | 2 | 65 | 15573 | 17236 | 15554 |
| 3 | 14333 | 57.2 | 4.5 | 2 | 65 | 15712 | 15620 | 15396 |

TABLE 2A-continued

Dataset for machine learning to predict hydraulic fracturing breakdown pressure

| Fracturing treatment number | Landing Depth | Well Azimuth @fracturing point | Deviation @fracturing point | Stress regime | Max horizontal stress angle | Vertical stress | Maximum horizontal stress | Minimum horizontal stress |
|---|---|---|---|---|---|---|---|---|
| 4 | 14631 | 46.4 | 7.1 | 1 | 65 | 16082 | 15384 | 13930 |
| 5 | 14806 | 35.3 | 9.4 | 1 | 65 | 16373 | 15258 | 13724 |
| 6 | 15065 | 28.7 | 10.0 | 2 | 65 | 16624 | 17584 | 14622 |
| 7 | 14627 | 331.6 | 3.3 | 2 | 55 | 15166 | 18957 | 12286 |
| 8 | 14744 | 334.7 | 3.8 | 2 | 55 | 15296 | 19618 | 13117 |
| 9 | 14889 | 339.4 | 3.9 | 2 | 55 | 15458 | 19325 | 12909 |
| 10 | 15044 | 333.0 | 5.0 | 2 | 55 | 15629 | 19562 | 13088 |
| 11 | 15152 | 381.0 | 5.6 | 2 | 55 | 15748 | 18247 | 12665 |
| 12 | 15285 | 330.8 | 6.3 | 2 | 55 | 15893 | 20951 | 13490 |
| 13 | 15380 | 328.7 | 6.6 | 2 | 55 | 16000 | 18510 | 12706 |
| 14 | 15021 | 165.2 | 88.2 | 1 | 75 | 15871 | 14462 | 12136 |
| 15 | 15029 | 163.2 | 88.6 | 1 | 75 | 15880 | 15691 | 12552 |
| 16 | 15035 | 162.6 | 88.4 | 2 | 75 | 15887 | 16518 | 13225 |
| 17 | 15046 | 165.2 | 88.5 | 2 | 75 | 15899 | 15992 | 12686 |
| 18 | 15051 | 164.4 | 88.6 | 1 | 75 | 15904 | 15705 | 12860 |
| 19 | 15062 | 165.8 | 88.2 | 2 | 75 | 15917 | 16176 | 12996 |
| 20 | 15070 | 164.0 | 88.5 | 2 | 75 | 15975 | 17406 | 13639 |
| 21 | 15078 | 164.4 | 88.6 | 2 | 75 | 15935 | 16673 | 13311 |
| 22 | 15088 | 163.6 | 88.2 | 2 | 75 | 15946 | 16322 | 13142 |
| 23 | 15095 | 164.1 | 88.3 | 2 | 75 | 15953 | 16585 | 13223 |
| 24 | 14664 | 28.3 | 87.9 | 2 | 65 | 15130 | 18252 | 13768 |
| 25 | 14663 | 28.2 | 88.0 | 2 | 65 | 15129 | 18167 | 13860 |
| 26 | 14660 | 27.6 | 88.0 | 2 | 65 | 15125 | 15606 | 13033 |
| 27 | 14654 | 27.3 | 88.0 | 2 | 65 | 15118 | 19230 | 14912 |
| 28 | 14647 | 27.7 | 88.0 | 2 | 65 | 15110 | 17213 | 13399 |
| 29 | 14643 | 28.2 | 87.9 | 2 | 65 | 15107 | 17493 | 13306 |
| . . . | . . . | . . . | . . . | . . . | . . . | . . . | . . . | . . . |
| 100 | 14587 | 17.7 | 88.0 | 2 | 65 | 15043 | 17293 | 13511 |

TABLE 2B

Dataset for machine learning to predict hydraulic fracturing breakdown pressure

| Fract. treatment number | Res. pressure | Rock type | Tensile strength | UCS | No. of perf. shots | Perf. interval | Perf. diameter | Breakdown pressure |
|---|---|---|---|---|---|---|---|---|
| 1 | 8857 | 1 | 1267 | 9075 | 12 | 2 | 0.042 | 17109 |
| 2 | 8861 | 2 | 1748 | 17478 | 12 | 2 | 0.042 | 16996 |
| 3 | 8864 | 3 | 1622 | 16219 | 12 | 2 | 0.042 | 18916 |
| 4 | 8874 | 2 | 1443 | 14432 | 12 | 2 | 0.042 | 18278 |
| 5 | 8882 | 2 | 1137 | 11375 | 12 | 2 | 0.042 | 17373 |
| 6 | 8888 | 2 | 1593 | 15928 | 12 | 2 | 0.042 | 19909 |
| 7 | 8600 | 1 | 2007 | 19609 | 12 | 2 | 0.042 | 14792 |
| 8 | 8604 | 1 | 2094 | 19809 | 12 | 2 | 0.042 | 17120 |
| 9 | 8609 | 1 | 2090 | 19403 | 12 | 2 | 0.042 | 16354 |
| 10 | 8604 | 2 | 2074 | 18644 | 12 | 2 | 0.042 | 16683 |
| 11 | 8618 | 2 | 1735 | 16959 | 12 | 2 | 0.042 | 15005 |
| 12 | 8622 | 1 | 2308 | 20100 | 12 | 2 | 0.042 | 17870 |
| 13 | 8625 | 1 | 1831 | 17550 | 12 | 2 | 0.042 | 14969 |
| 14 | 8500 | 2 | 972 | 15199 | 12 | 2 | 0.042 | 14417 |
| 15 | 8500 | 2 | 1278 | 21303 | 12 | 2 | 0.042 | 14744 |
| 16 | 8501 | 2 | 1374 | 22909 | 12 | 2 | 0.042 | 16032 |
| 17 | 8500 | 2 | 1343 | 22388 | 12 | 2 | 0.042 | 14907 |
| 18 | 8500 | 1 | 1196 | 12860 | 12 | 2 | 0.042 | 15570 |
| 19 | 8500 | 1 | 1320 | 22014 | 12 | 2 | 0.042 | 15631 |
| 20 | 8502 | 1 | 1563 | 26062 | 12 | 2 | 0.042 | 16571 |
| 21 | 8502 | 2 | 1403 | 23386 | 12 | 2 | 0.042 | 16160 |
| 22 | 8503 | 1 | 1329 | 22162 | 12 | 2 | 0.042 | 15930 |
| 23 | 8503 | 1 | 1397 | 23289 | 12 | 2 | 0.042 | 15978 |
| 24 | 8521 | 1 | 2072 | 18690 | 12 | 2 | 0.042 | 19315 |
| 25 | 8521 | 2 | 2016 | 18680 | 12 | 2 | 0.042 | 19291 |
| 26 | 8521 | 2 | 1278 | 16929 | 12 | 2 | 0.042 | 19270 |
| 27 | 8521 | 1 | 2109 | 17020 | 12 | 2 | 0.042 | 17181 |
| 28 | 8521 | 1 | 1792 | 17921 | 12 | 2 | 0.042 | 17187 |
| 29 | 8521 | 2 | 1864 | 18646 | 12 | 2 | 0.042 | 17191 |
| . . . | . . . | . . . | . . . | . . . | . . . | . . . | . . . | . . . |
| 100 | 8519 | 1 | 1790 | 17902 | 12 | 2 | 0.042 | 18435 |

TABLE 3A

Prediction of hydraulic fracturing breakdown pressure by machine learning
XGBoost regression.

| Fracturing Treatment Number | Landing Depth | Well Azimuth @fract. point | Deviation @fract. point | Stress regime | Max horizontal stress angle | Vertical stress | Max. hor. stress | Min. Hor. stress |
|---|---|---|---|---|---|---|---|---|
| 1 | 14859 | 339.4 | 3.9 | 2 | 55 | 15458 | 19325 | 12909 |
| 2 | 14674 | 27.3 | 80.0 | 2 | 65 | 15118 | 19230 | 14912 |
| 3 | 14347 | 27.7 | 85.0 | 2 | 65 | 15110 | 17213 | 13399 |
| 4 | 13643 | 28.2 | 86.0 | 2 | 65 | 15107 | 17493 | 13306 |
| 5 | 14000 | 28.0 | 86.0 | 2 | 65 | 16000 | 18000 | 13500 |

TABLE 3B

Prediction of hydraulic fracturing breakdown pressure by machine learning
XGBoost regression.

| Fracturing Treatment Number | Reservoir pressure | Rock type | Tensile strength | UCS | No. of perf. shots | Perf. interval | Perf. diameter | Breakdown pressure |
|---|---|---|---|---|---|---|---|---|
| 1 | 8609 | 1 | 2090 | 19403 | 12 | 2 | 0.042 | 16253.16 |
| 2 | 8521 | 1 | 2109 | 17020 | 12 | 2 | 0.042 | 17834.24 |
| 3 | 8521 | 1 | 1792 | 17921 | 12 | 2 | 0.042 | 18121.63 |
| 4 | 8521 | 2 | 1864 | 18646 | 12 | 2 | 0.042 | 17997.09 |
| 5 | 8521 | 2 | 1864 | 18646 | 12 | 2 | 0.042 | 18590.74 |

TABLE 4A

Dataset used for machine learning to predict hydraulic fracturing breakdown pressure

| Fracturing treatment number | Landing Depth | Well Azimuth @fract. point | Deviation @fract. point | Stress regime | Max. Hor. stress angle | Vertical stress | Max. Hor. stress | Min. Hor. stress | Res. pressure | Rock type |
|---|---|---|---|---|---|---|---|---|---|---|
| 1 | 14103 | 67.7 | 3.6 | 1 | 65 | 15421 | 14087 | 12642 | 8857 | 1 |
| 2 | 14220 | 61.5 | 4.2 | 2 | 65 | 15573 | 17236 | 15554 | 8861 | 2 |
| 3 | 14333 | 57.2 | 4.5 | 2 | 65 | 15712 | 15620 | 15396 | 8864 | 3 |
| 4 | 14631 | 46.4 | 7.1 | 1 | 65 | 16082 | 15384 | 13930 | 8874 | 2 |
| 5 | 14806 | 35.3 | 9.4 | 1 | 65 | 16373 | 15258 | 13724 | 8882 | 2 |
| 6 | 15065 | 28.7 | 10.0 | 2 | 65 | 16624 | 17584 | 14622 | 8888 | 2 |
| 7 | 14627 | 331.6 | 3.3 | 2 | 55 | 15166 | 18957 | 12286 | 8600 | 1 |
| 8 | 14744 | 334.7 | 3.8 | 2 | 55 | 15296 | 19618 | 13117 | 8604 | 1 |
| 9 | 14889 | 339.4 | 3.9 | 2 | 55 | 15458 | 19325 | 12909 | 8609 | 1 |
| 10 | 15044 | 333.0 | 5.0 | 2 | 55 | 15629 | 19562 | 13088 | 8604 | 2 |
| 11 | 15152 | 381.0 | 5.6 | 2 | 55 | 15748 | 18247 | 12665 | 8618 | 2 |
| 12 | 15285 | 330.8 | 6.3 | 2 | 55 | 15893 | 20951 | 13490 | 8622 | 1 |
| 13 | 15380 | 328.7 | 6.6 | 2 | 55 | 16000 | 18510 | 12706 | 8625 | 1 |
| 14 | 15021 | 165.2 | 88.2 | 1 | 75 | 15871 | 14462 | 12136 | 8500 | 2 |
| 15 | 15029 | 163.2 | 88.6 | 1 | 75 | 15880 | 15691 | 12552 | 8500 | 2 |
| 16 | 15035 | 162.6 | 88.4 | 2 | 75 | 15887 | 16518 | 13225 | 8501 | 2 |
| 17 | 15046 | 165.2 | 88.5 | 2 | 75 | 15899 | 15992 | 12686 | 8500 | 2 |
| 18 | 15051 | 164.4 | 88.6 | 1 | 75 | 15904 | 15705 | 12860 | 8500 | 1 |
| 19 | 15062 | 165.8 | 88.2 | 2 | 75 | 15917 | 16176 | 12996 | 8500 | 1 |
| 20 | 15070 | 164.0 | 88.5 | 2 | 75 | 15975 | 17406 | 13639 | 8502 | 1 |
| 21 | 15078 | 164.4 | 88.6 | 2 | 75 | 15935 | 16673 | 13311 | 8502 | 2 |
| 22 | 15088 | 163.6 | 88.2 | 2 | 75 | 15946 | 16322 | 13142 | 8503 | 1 |
| 23 | 15095 | 164.1 | 88.3 | 2 | 75 | 15953 | 16585 | 13223 | 8503 | 1 |
| 24 | 14664 | 28.3 | 87.9 | 2 | 65 | 15130 | 18252 | 13768 | 8521 | 1 |
| 25 | 14663 | 28.2 | 88.0 | 2 | 65 | 15129 | 18167 | 13860 | 8521 | 2 |
| 26 | 14660 | 27.6 | 88.0 | 2 | 65 | 15125 | 15606 | 13033 | 8521 | 2 |
| 27 | 14654 | 27.3 | 88.0 | 2 | 65 | 15118 | 19230 | 14912 | 8521 | 1 |
| 28 | 14647 | 27.7 | 88.0 | 2 | 65 | 15110 | 17213 | 13399 | 8521 | 1 |
| 29 | 14643 | 28.2 | 87.9 | 2 | 65 | 15107 | 17493 | 13306 | 8521 | 2 |
| ... | ... | ... | ... | ... | ... | ... | ... | ... | ... | ... |
| 100 | 14587 | 17.7 | 88.0 | 2 | 65 | 15043 | 17293 | 13511 | 8519 | 1 |

TABLE 4B

Dataset used for machine learning to predict hydraulic fracturing breakdown pressure

| Fracturing treatment number | Porosity | Tensile strength | UCS | Number of perforation shots | Perforation interval | Perforation diameter | Breakdown pressure |
|---|---|---|---|---|---|---|---|
| 1 | 0.10 | 1267 | 9075 | 12 | 2 | 0.042 | 17109 |
| 2 | 0.12 | 1748 | 17478 | 12 | 2 | 0.042 | 16996 |
| 3 | 0.12 | 1622 | 16219 | 12 | 2 | 0.042 | 18916 |
| 4 | 0.09 | 1443 | 14432 | 12 | 2 | 0.042 | 18278 |
| 5 | 0.10 | 1137 | 11375 | 12 | 2 | 0.042 | 17373 |
| 6 | 0.08 | 1593 | 15928 | 12 | 2 | 0.042 | 19909 |
| 7 | 0.13 | 2007 | 19609 | 12 | 2 | 0.042 | 14792 |
| 8 | 0.11 | 2094 | 19809 | 12 | 2 | 0.042 | 17120 |
| 9 | 0.10 | 2090 | 19403 | 12 | 2 | 0.042 | 16354 |
| 10 | 0.09 | 2074 | 18644 | 12 | 2 | 0.042 | 16683 |
| 11 | 0.12 | 1735 | 16959 | 12 | 2 | 0.042 | 15005 |
| 12 | 0.13 | 2308 | 20100 | 12 | 2 | 0.042 | 17870 |
| 13 | 0.12 | 1831 | 17550 | 12 | 2 | 0.042 | 14969 |
| 14 | 0.15 | 972 | 15199 | 12 | 2 | 0.042 | 14417 |
| 15 | 0.15 | 1278 | 21303 | 12 | 2 | 0.042 | 14744 |
| 16 | 0.13 | 1374 | 22909 | 12 | 2 | 0.042 | 16032 |
| 17 | 0.14 | 1343 | 22388 | 12 | 2 | 0.042 | 14907 |
| 18 | 0.12 | 1196 | 12860 | 12 | 2 | 0.042 | 15570 |
| 19 | 0.10 | 1320 | 22014 | 12 | 2 | 0.042 | 15631 |
| 20 | 0.11 | 1563 | 26062 | 12 | 2 | 0.042 | 16571 |
| 21 | 0.09 | 1403 | 23386 | 12 | 2 | 0.042 | 16160 |
| 22 | 0.09 | 1329 | 22162 | 12 | 2 | 0.042 | 15930 |
| 23 | 0.10 | 1397 | 23289 | 12 | 2 | 0.042 | 15978 |
| 24 | 0.07 | 2072 | 18690 | 12 | 2 | 0.042 | 19315 |
| 25 | 0.08 | 2016 | 18680 | 12 | 2 | 0.042 | 19291 |
| 26 | 0.08 | 1278 | 16929 | 12 | 2 | 0.042 | 19270 |
| 27 | 0.09 | 2109 | 17020 | 12 | 2 | 0.042 | 17181 |
| 28 | 0.10 | 1792 | 17921 | 12 | 2 | 0.042 | 17187 |
| 29 | 0.08 | 1864 | 18646 | 12 | 2 | 0.042 | 17191 |
| . . . | . . . | . . . | . . . | . . . | . . . | . . . | . . . |
| 100 | 0.07 | 1790 | 17902 | 12 | 2 | 0.042 | 18435 |

TABLE 5A

Prediction of hydraulic fracturing breakdown pressure by machine learning XGBoost regression

| Fract. Treatment Number | Landing Depth | Well Azimuth @fract. point | Deviation @fracturing point | Stress regime | Max hor. stress angle | Vert. stress | Max. hor. stress | Min. Hor. stress |
|---|---|---|---|---|---|---|---|---|
| 1 | 14859 | 339.4 | 3.9 | 2 | 55 | 15458 | 19325 | 12909 |
| 2 | 14674 | 27.3 | 80.0 | 2 | 65 | 15118 | 19230 | 14912 |
| 3 | 14347 | 27.7 | 85.0 | 2 | 65 | 15110 | 17213 | 13399 |
| 4 | 13643 | 28.2 | 86.0 | 2 | 65 | 15107 | 17493 | 13306 |
| 5 | 14000 | 28.0 | 86.0 | 2 | 65 | 16000 | 18000 | 13500 |

TABLE 5B

Prediction of hydraulic fracturing breakdown pressure by machine learning XGBoost regression

| Fracturing Treatment Number | Res. pressure | Rock type | Porosity | Tensile strength | UCS | Number of perf. shots | Perf. interval | Perf. diameter | Breakdown pressure |
|---|---|---|---|---|---|---|---|---|---|
| 1 | 8609 | 1 | 0.06 | 2090 | 19403 | 12 | 2 | 0.042 | 16838.63 |
| 2 | 8521 | 1 | 0.07 | 2109 | 17020 | 12 | 2 | 0.042 | 18299.94 |
| 3 | 8521 | 1 | 0.09 | 1792 | 17921 | 12 | 2 | 0.042 | 17804.94 |
| 4 | 8521 | 2 | 0.08 | 1864 | 18646 | 12 | 2 | 0.042 | 18142.94 |
| 5 | 8521 | 2 | 0.10 | 1864 | 18646 | 12 | 2 | 0.042 | 17950.07 |

TABLE 6A

Dataset used for machine learning to predict hydraulic fracture initiation success or not

| Fract. Number | Landing Depth | Well Azimuth @fract. point | Deviation @fract. point | Max hor. stress angle | Vertical stress | Max. Hor. stress | Min. Hor. stress | Reservoir pressure | Rock type |
|---|---|---|---|---|---|---|---|---|---|
| 1 | 14103 | 67.7 | 3.6 | 65 | 15421 | 14087 | 12642 | 8857 | 1 |
| 2 | 14220 | 61.5 | 4.2 | 65 | 15573 | 17236 | 15554 | 8861 | 1 |
| 3 | 14333 | 57.2 | 4.5 | 65 | 15712 | 15620 | 15396 | 8864 | 1 |
| 4 | 14631 | 46.4 | 7.1 | 65 | 16082 | 15384 | 13930 | 8874 | 2 |
| 5 | 14806 | 35.3 | 9.4 | 65 | 16373 | 15258 | 13724 | 8882 | 2 |
| 6 | 15065 | 28.7 | 10.0 | 65 | 16624 | 17584 | 14622 | 8888 | 2 |
| 7 | 14627 | 331.6 | 3.3 | 55 | 15166 | 18957 | 12286 | 8600 | 1 |
| 8 | 14744 | 334.7 | 3.8 | 55 | 15296 | 19618 | 13117 | 8604 | 1 |
| 9 | 14889 | 339.4 | 3.9 | 55 | 15458 | 19325 | 12909 | 8609 | 1 |
| 10 | 15044 | 333.0 | 5.0 | 55 | 15629 | 19562 | 13088 | 8604 | 2 |
| 11 | 15152 | 381.0 | 5.6 | 55 | 15748 | 18247 | 12665 | 8618 | 2 |
| 12 | 15285 | 330.8 | 6.3 | 55 | 15893 | 20951 | 13490 | 8622 | 1 |
| 13 | 15380 | 328.7 | 6.6 | 55 | 16000 | 18510 | 12706 | 8625 | 1 |
| 14 | 15021 | 165.2 | 88.2 | 75 | 15871 | 14462 | 12136 | 8500 | 2 |
| 15 | 15029 | 163.2 | 88.6 | 75 | 15880 | 15691 | 12552 | 8500 | 2 |
| 16 | 15035 | 162.6 | 88.4 | 75 | 15887 | 16518 | 13225 | 8501 | 2 |
| 17 | 15046 | 165.2 | 88.5 | 75 | 15899 | 15992 | 12686 | 8500 | 2 |
| 18 | 15051 | 164.4 | 88.6 | 75 | 15904 | 15705 | 12860 | 8500 | 1 |
| 19 | 15062 | 165.8 | 88.2 | 75 | 15917 | 16176 | 12996 | 8500 | 1 |
| 20 | 15070 | 164.0 | 88.5 | 75 | 15975 | 17406 | 13639 | 8502 | 1 |
| 21 | 15078 | 164.4 | 88.6 | 75 | 15935 | 16673 | 13311 | 8502 | 2 |
| 22 | 15088 | 163.6 | 88.2 | 75 | 15946 | 16322 | 13142 | 8503 | 1 |
| 23 | 15095 | 164.1 | 88.3 | 75 | 15953 | 16585 | 13223 | 8503 | 1 |
| 24 | 14664 | 28.3 | 87.9 | 65 | 15130 | 18252 | 13768 | 8521 | 1 |
| 25 | 14663 | 28.2 | 88.0 | 65 | 15129 | 18167 | 13860 | 8521 | 2 |
| 26 | 14660 | 27.6 | 88.0 | 65 | 15125 | 15606 | 13033 | 8521 | 2 |
| 27 | 14654 | 27.3 | 88.0 | 65 | 15118 | 19230 | 14912 | 8521 | 1 |
| 28 | 14647 | 27.7 | 88.0 | 65 | 15110 | 17213 | 13399 | 8521 | 1 |
| 29 | 14643 | 28.2 | 87.9 | 65 | 15107 | 17493 | 13306 | 8521 | 2 |
| . . . | . . . | . . . | . . . | . . . | . . . | . . . | . . . | . . . | . . . |
| 100 | 14587 | 17.7 | 88.0 | 65 | 15043 | 17293 | 13511 | 8519 | 1 |

TABLE 6B

Dataset used for machine learning to predict hydraulic fracture initiation success or not

| Fracturing Number | Rock type | Porosity | Tensile strength | UCS | No. of perf. shots | Perf. interval | Perf. diameter | Breakdown pressure | Fracture initiation or not |
|---|---|---|---|---|---|---|---|---|---|
| 1 | 1 | 0.1 | 1267 | 9075 | 12 | 2 | 0.042 | 17109 | 1 |
| 2 | 1 | 0.12 | 1748 | 17478 | 12 | 2 | 0.042 | 16996 | 1 |
| 3 | 1 | 0.12 | 1622 | 16219 | 12 | 2 | 0.042 | 18916 | 1 |
| 4 | 2 | 0.09 | 1443 | 14432 | 12 | 2 | 0.042 | 18278 | 1 |
| 5 | 2 | 0.095 | 1137 | 11375 | 12 | 2 | 0.042 | 17373 | 1 |
| 6 | 2 | 0.08 | 1593 | 15928 | 12 | 2 | 0.042 | 19909 | 1 |
| 7 | 1 | 0.13 | 2007 | 19609 | 12 | 2 | 0.042 | 14792 | 0 |
| 8 | 1 | 0.11 | 2094 | 19809 | 12 | 2 | 0.042 | 17120 | 1 |
| 9 | 1 | 0.1 | 2090 | 19403 | 12 | 2 | 0.042 | 16354 | 1 |
| 10 | 2 | 0.09 | 2074 | 18644 | 12 | 2 | 0.042 | 16683 | 1 |
| 11 | 2 | 0.12 | 1735 | 16959 | 12 | 2 | 0.042 | 15005 | 0 |
| 12 | 1 | 0.13 | 2308 | 20100 | 12 | 2 | 0.042 | 17870 | 1 |
| 13 | 1 | 0.12 | 1831 | 17550 | 12 | 2 | 0.042 | 14969 | 0 |
| 14 | 2 | 0.15 | 972 | 15199 | 12 | 2 | 0.042 | 14417 | 0 |
| 15 | 2 | 0.15 | 1278 | 21303 | 12 | 2 | 0.042 | 14744 | 0 |
| 16 | 2 | 0.13 | 1374 | 22909 | 12 | 2 | 0.042 | 16032 | 1 |
| 17 | 2 | 0.14 | 1343 | 22388 | 12 | 2 | 0.042 | 14907 | 0 |
| 18 | 1 | 0.12 | 1196 | 12860 | 12 | 2 | 0.042 | 15570 | 1 |
| 19 | 1 | 0.1 | 1320 | 22014 | 12 | 2 | 0.042 | 15631 | 0 |
| 20 | 1 | 0.11 | 1563 | 26062 | 12 | 2 | 0.042 | 16571 | 1 |
| 21 | 2 | 0.09 | 1403 | 23386 | 12 | 2 | 0.042 | 16160 | 1 |
| 22 | 1 | 0.09 | 1329 | 22162 | 12 | 2 | 0.042 | 15930 | 0 |
| 23 | 1 | 0.1 | 1397 | 23289 | 12 | 2 | 0.042 | 15978 | 0 |
| 24 | 1 | 0.07 | 2072 | 18690 | 12 | 2 | 0.042 | 19315 | 1 |
| 25 | 2 | 0.08 | 2016 | 18680 | 12 | 2 | 0.042 | 19291 | 1 |
| 26 | 2 | 0.08 | 1278 | 16929 | 12 | 2 | 0.042 | 19270 | 1 |

TABLE 6B-continued

Dataset used for machine learning to predict hydraulic fracture initiation success or not

| Fracturing Number | Rock type | Porosity | Tensile strength | UCS | No. of perf. shots | Perf. interval | Perf. diameter | Breakdown pressure | Fracture initiation or not |
|---|---|---|---|---|---|---|---|---|---|
| 27 | 1 | 0.09 | 2109 | 17020 | 12 | 2 | 0.042 | 17181 | 1 |
| 28 | 1 | 0.1 | 1792 | 17921 | 12 | 2 | 0.042 | 17187 | 1 |
| 29 | 2 | 0.08 | 1864 | 18646 | 12 | 2 | 0.042 | 17191 | 1 |
| . . . | . . . | . . . | . . . | . . . | . . . | . . . | . . . | . . . | . . . |
| 100 | 1 | 0.07 | 1790 | 17902 | 12 | 2 | 0.042 | 18435 | 1 |

TABLE 7A

Prediction of hydraulic fracture initiation by machine learning XGBoost classifier.

| Fracturing Number | Landing Depth | Well Azimuth @fract. point | Deviation @fract. point | Max. hor. Stress angle | Vertical stress | Max. Hor. stress | Min. Hor. Stress | Reservoir pressure | Rock type |
|---|---|---|---|---|---|---|---|---|---|
| 1 | 14859 | 339.4 | 3.9 | 55 | 15458 | 19325 | 12909 | 8600 | 1 |
| 2 | 14674 | 27.3 | 80.0 | 65 | 15118 | 19230 | 14912 | 8250 | 1 |
| 3 | 14347 | 27.7 | 85.0 | 67 | 15110 | 17213 | 13399 | 8500 | 1 |
| 4 | 13643 | 28.2 | 86.0 | 65 | 15107 | 17493 | 13306 | 8521 | 2 |
| 5 | 14000 | 28.0 | 86.0 | 70 | 16000 | 18000 | 13500 | 8500 | 2 |
| 6 | 14000 | 28.0 | 86.0 | 64 | 15500 | 17500 | 13200 | 8520 | 2 |

TABLE 7B

Prediction of hydraulic fracture initiation by machine learning XGBoost classifier.

| Fracturing Number | Porosity | Tensile strength | UCS | Number of perforation shots | Perforation interval | Perforation diameter | Breakdown pressure | Fracture initiation or not |
|---|---|---|---|---|---|---|---|---|
| 1 | 0.06 | 2090 | 19403 | 12 | 2 | 0.042 | 16000 | 1 |
| 2 | 0.07 | 2109 | 17020 | 12 | 2 | 0.042 | 17000 | 1 |
| 3 | 0.09 | 1792 | 17921 | 12 | 2 | 0.042 | 15000 | 0 |
| 4 | 0.08 | 1864 | 18646 | 12 | 2 | 0.042 | 14000 | 0 |
| 5 | 0.1 | 1864 | 18646 | 12 | 2 | 0.042 | 18000 | 1 |
| 6 | 0.12 | 1800 | 15000 | 12 | 2 | 0.042 | 19000 | 1 |

FIG. 6 is a flowchart of an example of a method 600 for predicting hydraulic fracture initiation, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, a fracking operations dataset is prepared based on historical information for a group of fracking wells from fields. For example, historical information from past fracking and production operations can be accessed, including parameters used over time and the results of fracking. From 602, method 600 proceeds to 604.

At 604, a set of hyper-parameters is tuned for use in a configured to predict fracture initiation in new fracturing wells. As an example, the set of hyper-parameters can include learning_rate, gamma (minimum loss reduction required to make a further split on a machine learning algorithm leaf node of the tree), max_depth (maximum depth of a tree; increasing this value will make the model more complex and likely to over-fit), and max_leaves (maximum number of leaves in a tree). In some implementations, the machine learning algorithm can be an XGBoost algorithm. From 604, method 600 proceeds to 606.

At 606, the fracking operations dataset is divided into a training dataset and a test dataset, where the training dataset is configured to train a fracture initiation prediction model. For example, the fracking operations dataset can include, for each fracking well: well survey data including landing depth of TVD, azimuth, and deviation; a stress regime, in-situ stresses and orientation; rock types and rock mechanical properties; perforation related properties; and a breakdown pressure and a fracture initiation classification. From 606, method 600 proceeds to 608.

At 608, a regression algorithm is applied to train the training dataset and to validate with the test dataset. The algorithm can include use of Equations (2) to (5), for example. From 608, method 600 proceeds to 610.

At 610, a target variable of a breakdown pressure for a new hydraulic fracturing treatment is set using the fracture initiation prediction model and the training dataset. The target can be, for example, an initial starting point for the breakdown pressure that is known to be a good starting point. From 610, method 600 proceeds to 612. For example, a sample dataset for machine learning to predict hydraulic fracturing breakdown pressure is provided in tables 2A and 2B.

At 612, the training dataset is updated based on at least the target variable. Tables 1A and 1B provide example values of the variables. From 612, method 600 proceeds to 614.

At 614, the training dataset is trained using a classifier of the machine learning algorithm. From 614, method 600 proceeds to 616.

At 616, a prediction is made using the training dataset whether the new hydraulic fracturing treatment can be initiated. Examples of predicted values are provided in Tables 3A, 3B, 5A, and 5B. Predicting whether the new hydraulic fracturing treatment can be initiated or not can include using a prediction function based on previous predictions, as described in Equations (6)-(9). The prediction function can include learning rate multipliers applied to previous predictions. From 616, method 600 proceeds to 618.

At 618, the breakdown pressure is incrementally adjusted, and the updating, training, and predicting are repeated until successful hydraulic fracture initiation is predicted.

Figure 7:
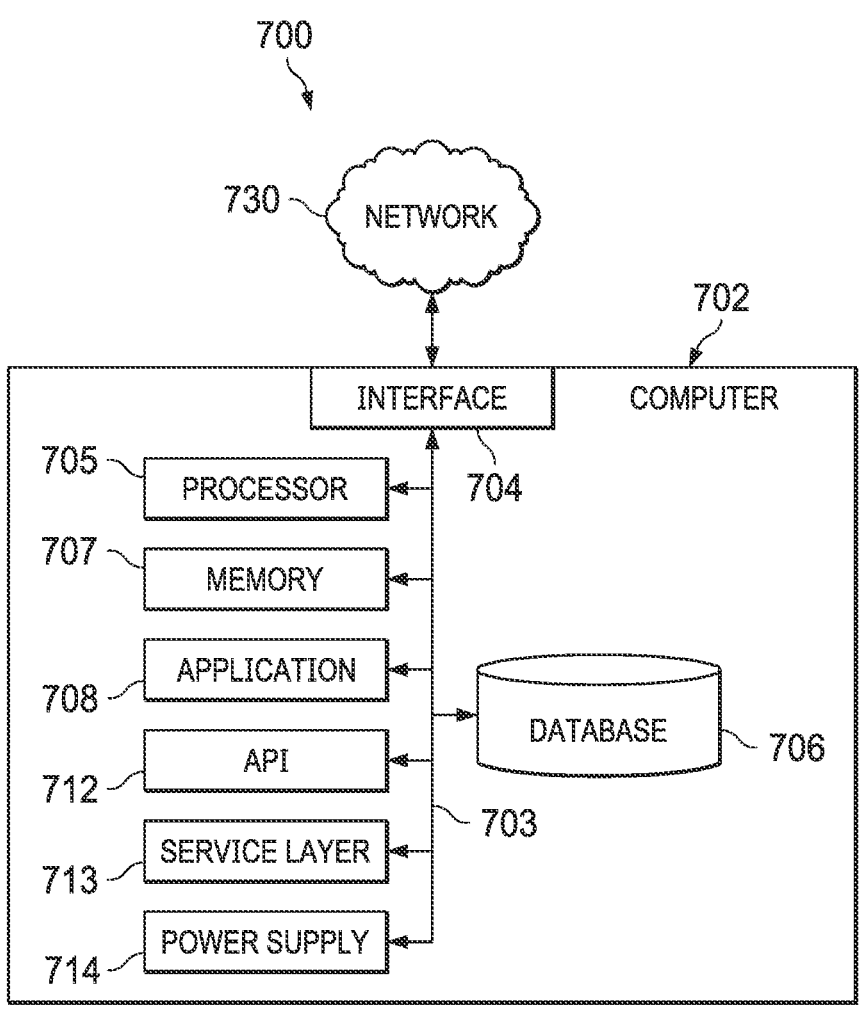
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user-or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes the following. A fracking operations dataset is prepared based on historical information for a group of fracking wells from fields. A set of hyper-parameters of a machine learning algorithm configured to predict fracture initiation for new fracturing wells are tuned. The fracking operations dataset is divided into a training dataset and a test dataset, where the training dataset is configured to train a fracture initiation prediction model. A regression algorithm is applied to train the training dataset and to validate with the test dataset. A target variable of a breakdown pressure for a new hydraulic fracturing treatment is determined using the fracture initiation prediction model and the training dataset. A prediction dataset is updated based on at least the target variable. The training dataset is trained using a classifier of the machine learning algorithm. Using the prediction dataset, a prediction is made whether the new hydraulic fracturing treatment can be initiated or not. The breakdown pressure is incrementally adjusted, and the updating, training, and predicting are repeated until successful hydraulic fracture initiation is predicted.

The foregoing and other described implementations can each, optionally, include one or more of the following features:

A first feature, combinable with any of the following features, where the set of hyper-parameters includes at least learning_rate, gamma, max_depth, and max_leaves.

A second feature, combinable with any of the previous or following features, where the fracking operations dataset includes, for each fracking well: well survey data including landing depth of TVD, azimuth, and deviation; a stress regime, in-situ stresses and orientation; rock types and rock mechanical properties; perforation related properties; and a breakdown pressure and a fracture initiation classification.

A third feature, combinable with any of the previous or following features, where the machine learning algorithm is an XGBoost algorithm.

A fourth feature, combinable with any of the previous or following features, where incrementally adjusting the breakdown pressure includes increasing the breakdown pressure in increments of 200 pounds per square inch (psi).

A fifth feature, combinable with any of the previous or following features, where predicting whether the new hydraulic fracturing treatment can be initiated or not includes using a prediction function based on previous predictions.

A sixth feature, combinable with any of the previous or following features, where the prediction function includes learning rate multipliers applied to previous predictions.

In a second implementation, a non-transitory, computer-readable medium stores one or more instructions executable by a computer system to perform operations including the following. A fracking operations dataset is prepared based on historical information for a group of fracking wells from fields. A set of hyper-parameters of a machine learning algorithm configured to predict fracture initiation for new fracturing wells are tuned. The fracking operations dataset is divided into a training dataset and a test dataset, where the training dataset is configured to train a fracture initiation prediction model. A regression algorithm is applied to train the training dataset and to validate with the test dataset. A target variable of a breakdown pressure for a new hydraulic fracturing treatment is determined using the fracture initiation prediction model and the training dataset. A prediction dataset is updated based on at least the target variable. The training dataset is trained using a classifier of the machine learning algorithm. Using the prediction dataset, a prediction is made whether the new hydraulic fracturing treatment can be initiated or not. The breakdown pressure is incrementally adjusted, and the updating, training, and predicting are repeated until successful hydraulic fracture initiation is predicted.

The foregoing and other described implementations can each, optionally, include one or more of the following features:

A first feature, combinable with any of the following features, where the set of hyper-parameters includes at least learning_rate, gamma, max_depth, and max_leaves.

A second feature, combinable with any of the previous or following features, where the fracking operations dataset includes, for each fracking well: well survey data including landing depth of TVD, azimuth, and deviation; a stress regime, in-situ stresses and orientation; rock types and rock mechanical properties; perforation related properties; and a breakdown pressure and a fracture initiation classification.

A third feature, combinable with any of the previous or following features, where the machine learning algorithm is an XGBoost algorithm.

A fourth feature, combinable with any of the previous or following features, where incrementally adjusting the breakdown pressure includes increasing the breakdown pressure in increments of 200 pounds per square inch (psi).

A fifth feature, combinable with any of the previous or following features, where predicting whether the new hydraulic fracturing treatment can be initiated or not includes using a prediction function based on previous predictions.

A sixth feature, combinable with any of the previous or following features, where the prediction function includes learning rate multipliers applied to previous predictions.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A fracking operations dataset is prepared based on historical information for a group of fracking wells from fields. A set of hyper-parameters of a machine learning algorithm configured to predict fracture initiation for new fracturing wells are tuned. The fracking operations dataset is divided into a training dataset and a test dataset, where the training dataset is configured to train a fracture initiation prediction model. A regression algorithm is applied to train the training dataset and to validate with the test dataset. A target variable of a breakdown pressure for a new hydraulic fracturing treatment is determined using the fracture initiation prediction model and the training dataset. A prediction dataset is updated based on at least the target variable. The training dataset is trained using a classifier of the machine learning algorithm. Using the prediction dataset, a prediction is made whether the new hydraulic fracturing treatment can be initiated or not. The breakdown pressure is incrementally adjusted, and the updating, training, and predicting are repeated until successful hydraulic fracture initiation is predicted.

The foregoing and other described implementations can each, optionally, include one or more of the following features:

A first feature, combinable with any of the following features, where the set of hyper-parameters includes at least learning_rate, gamma, max_depth, and max_leaves.

A second feature, combinable with any of the previous or following features, where the fracking operations dataset includes, for each fracking well: well survey data including landing depth of TVD, azimuth, and deviation; a stress regime, in-situ stresses and orientation; rock types and rock mechanical properties; perforation related properties; and a breakdown pressure and a fracture initiation classification.

A third feature, combinable with any of the previous or following features, where the machine learning algorithm is an XGBoost algorithm.

A fourth feature, combinable with any of the previous or following features, where incrementally adjusting the breakdown pressure includes increasing the breakdown pressure in increments of 200 pounds per square inch (psi).

A fifth feature, combinable with any of the previous or following features, where predicting whether the new hydraulic fracturing treatment can be initiated or not includes using a prediction function based on previous predictions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method, comprising:
preparing a fracking operations dataset based on historical information for a group of fracking wells from fields, the fracking operations dataset comprising a plurality of depth-specific fracturing treatments, each depth-specific fracturing treatment comprising a stress regime, a rock type, a porosity, a number of perforations, a perforation interval, a perforation diameter, a breakdown pressure, and a fracture initiation classification, wherein the stress regime represents one of a normal fault or a strike-slip, and the rock type represents one of shale, sandstone, or carbonate;
tuning a set of hyper-parameters of a machine learning algorithm configured to predict fracture initiation for new fracturing wells;
dividing the fracking operations dataset into a training dataset and a test dataset, wherein the training dataset is configured to train a fracture initiation prediction model;
applying a regression algorithm to train with the training dataset and to validate with the test dataset;
for each new depth-specific hydraulic fracturing treatment of a plurality of new depth-specific hydraulic fracturing treatments:
determining, using the fracture initiation prediction model and the training dataset, a breakdown pressure for the new depth-specific hydraulic fracturing treatment;
updating a prediction dataset based on at least the breakdown pressure;
training the training dataset using a classifier of the machine learning algorithm;
predicting, using the prediction dataset, whether the new depth-specific hydraulic fracturing treatment can be initiated or not; and
incrementally adjusting the breakdown pressure and repeating the updating, training, and predicting until successful hydraulic fracture initiation at the new depth-specific hydraulic fracturing treatment is predicted;

selecting a hydraulic fracturing design by selecting a casing, a treatment tubing, a wellhead, and a pumping schedule based on the breakdown pressures for the plurality of new depth-specific hydraulic fracturing treatments; and injecting a fracking fluid containing proppants into a wellbore based on the pumping schedule such that the fracking fluid flows through perforations to create fractures in a reservoir at each new depth-specific fracturing treatment of the plurality of new depth-specific hydraulic fracturing treatments.

2. The method of claim 1, wherein the set of hyper-parameters includes at least learning_rate, gamma, max_depth, and max_leaves.

3. The method of claim 1, wherein the fracking operations dataset includes, for each fracking well: well survey data including landing depth of true vertical depth, azimuth, and deviation, in-situ stresses and orientation, and rock mechanical properties.

4. The method of claim 1, wherein the machine learning algorithm is an XGBoost algorithm.

5. The method of claim 1, wherein incrementally adjusting the breakdown pressure includes increasing the breakdown pressure in increments of 200 pounds per square inch (psi).

6. The method of claim 1, wherein incrementally adjusting the breakdown pressure includes increasing the breakdown pressure in increments of 400 pounds per square inch (psi).

7. The method of claim 1, wherein predicting whether the new depth-specific hydraulic fracturing treatment can be initiated or not includes using a prediction function based on previous predictions.

8. The method of claim 7, wherein the prediction function includes learning rate multipliers applied to previous predictions.

9. The method of claim 1, wherein the plurality of depth-specific fracturing treatments comprises 100 depth-specific fracturing treatments.

10. The method of claim 9, wherein the plurality of new depth-specific fracturing treatments comprises 6 depth-specific fracturing treatments.

11. A method for fracturing a reservoir, the method comprising:

collecting hydraulic fracturing field data for a plurality of depth-specific fracturing treatments, the hydraulic fracturing field data representing historical information for a group of fracking wells from fields, and comprises, for each depth-specific fracturing treatment of the plurality of depth-specific fracturing treatments, a stress regime, a rock type, a porosity, a number of perforations, a perforation interval, a perforation diameter, a breakdown pressure, and a fracture initiation classification, wherein the stress regime represents one of a normal fault or a strike-slip, and the rock type represents one of shale, sandstone, or carbonate;

training, by a computer, a machine learning model for predicting breakdown pressures and fracture initiation classifications for new depth-specific fracturing treatments using a regression algorithm and most of the hydraulic fracturing field data, wherein the machine learning model can handle missing values;

predicting, by the computer, breakdown pressures and fracture initiation classifications for new depth-specific fracturing treatments using the trained machine learning model;

selecting a hydraulic fracturing design of a wellbore by selecting a casing, a treatment tubing, a wellhead, and a pumping schedule based on the predicted breakdown pressures and fracture initiation classifications for the new depth-specific fracturing treatments; and injecting a fracking fluid containing proppants into the wellbore based on the pumping schedule such that the fracking fluid flows through perforations to create fractures in the reservoir at the new depth-specific fracturing treatments.

12. The method of claim 11, comprising testing the trained machine learning model using the rest of the hydraulic fracturing field data, and then using the trained and tested machine learning model to predict the breakdown pressures and fracture initiation classifications for the new depth-specific fracturing treatments.

13. The method of claim 11, comprising in response to determining that a predicted fracture initiation classification for at least one of the new depth-specific fracturing treatments represents no fracture initiation, increasing the breakdown pressure, and updating the fracture initiation classification prediction.

14. The method of claim 11, wherein at least one of the predicted fracture initiation classifications for the new depth-specific fracturing treatments represents no fracture initiation, and at least one of the predicted fracture initiation classifications for the new depth-specific fracturing treatments represents fracture initiation.

15. The method of claim 14, comprising, for the at least one of the predicted fracture initiation classifications representing no fracture initiation:

increasing the breakdown pressure by at least 200 pounds per square inch; and updating the fracture initiation classification prediction.

16. The method of claim 11, wherein the hydraulic fracturing field data for each depth-specific fracturing treatment comprises a tensile strength, an ultimate compressive strength, a landing depth, a well azimuth, a deviation, a vertical stress, a maximum horizontal stress, a minimum horizontal stress, and a reservoir pressure.

17. The method of claim 11, wherein the predicted breakdown pressures represent an internal casing pressure when fractures initiate from a perforation tunnel.

18. The method of claim 11, wherein the plurality of depth-specific fracturing treatments comprises 100 depth-specific fracturing treatments, and the new depth-specific fracturing treatments comprises 6 depth-specific fracturing treatments.

19. The method of claim 11, comprising tuning a set of hyper-parameters of the machine learning model, the set of hyper-parameters comprising a learning_rate, a gamma, a max_depth, and max_leaves.

20. A method comprising:

receiving, at a computer, a fracking operations dataset comprising historical information for a group of fracking wells from fields, the fracking operations dataset representing a plurality of depth-specific fracturing treatments and comprising, for each depth-specific fracturing treatment, a stress regime, a rock type, a porosity, a number of perforations, a perforation interval, a perforation diameter, a breakdown pressure, and a fracture initiation classification, wherein the stress regime represents one of a normal fault or a strike-slip, and the rock type represents one of shale, sandstone, or carbonate;

for each depth-specific fracturing treatment of a plurality of new depth-specific fracturing treatments:

predicting, by the computer using a machine learning algorithm trained on the fracking operations dataset, a breakdown pressure at the respective depth-specific fracturing treatment;

predicting, by the computer using the machine learning algorithm trained on the fracking operations dataset, a fracture initiation classification representing whether hydraulic fracture can be initiated at the respective depth-specific fracturing treatment; and in response to the fracture initiation classification being indicative of an unsuccessful fracture initiation at the respective depth-specific fracturing treatment, updating the breakdown pressure prediction and the fracture initiation classification prediction until the fracture initiation classification is indicative of a successful fracture initiation;

selecting a hydraulic fracturing design of a wellbore by selecting a casing, a treatment tubing, a wellhead, and a pumping schedule based on the predicted breakdown pressures and successful fracture initiation classifications for the plurality of new depth-specific fracturing treatments; and injecting a fracking fluid into the wellbore to initiate fractures at the plurality of new depth-specific fracturing treatments.

* * * * *